US007657059B2

(12) United States Patent
Olson et al.

(10) Patent No.: US 7,657,059 B2
(45) Date of Patent: Feb. 2, 2010

(54) METHOD AND APPARATUS FOR TRACKING AN OBJECT

(75) Inventors: Teresa Lorae Pace Olson, Orlando, FL (US); Harry Lee, Maitland, FL (US); James Joseph Slaski, Orlando, FL (US); Jason Sefcik, Orlando, FL (US); Jamie Cannon, Clermont, FL (US); Robert Stanfill, Kissimmee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 545 days.

(21) Appl. No.: 10/636,763

(22) Filed: Aug. 8, 2003

(65) Prior Publication Data
US 2005/0031165 A1 Feb. 10, 2005

(51) Int. Cl.
*G06K 9/00* (2006.01)
(52) U.S. Cl. ..................... 382/103; 382/107
(58) Field of Classification Search ........... 382/103, 382/107; 348/169, 170, 171, 172; 342/64, 342/52, 55, 62; 244/3.15, 3.16, 3.17
See application file for complete search history.

(56) References Cited

U.S. PATENT DOCUMENTS

| | | | |
|---|---|---|---|
| 2,981,942 A * | 4/1961 | Gross | 342/88 |
| 4,470,048 A | 9/1984 | Short, III | |
| 4,550,435 A | 10/1985 | Hayman | |
| 4,739,401 A * | 4/1988 | Sacks et al. | 382/103 |
| 4,849,906 A | 7/1989 | Chodos | |
| H713 H | 11/1989 | May et al. | |
| 5,187,777 A * | 2/1993 | Conboy et al. | 345/502 |
| 5,214,433 A | 5/1993 | Alouani et al. | |
| 5,235,651 A | 8/1993 | Nafarieh | |
| 5,323,472 A | 6/1994 | Falk | |

(Continued)

FOREIGN PATENT DOCUMENTS

| | | |
|---|---|---|
| EP | 0005918 | 12/1979 |
| EP | 320306 A2 * | 6/1989 |
| GB | 2030416 A * | 4/1980 |

OTHER PUBLICATIONS

*Spatiotemporal Multiscan Adaptive Matched Filtering*, Kenneth A. Melendez and James W. Modestino, Paper No. 2561-06, SPIE Proceedings vol. 2561, Signal and Data Processing of Small Targets, pp. 51-65, 1995, ISBN 0 8194 1920 6.

(Continued)

*Primary Examiner*—Bhavesh M Mehta
*Assistant Examiner*—Sean Motsinger
(74) *Attorney, Agent, or Firm*—Buchanan Ingersoll & Rooney PC

(57) ABSTRACT

A method and apparatus for tracking an object in an image. An image of a scene comprising an object is received. The image is processed with a first tracker to produce a first estimate of a position of the object in the image and a first confidence value. The image is processed with a second tracker to produce a second estimate of the position of the object in the image and a second confidence value. The second tracker processes the image concurrently with the first tracker. An estimate of the position of the object in the image is selected using the first and second confidence values. The object is then tracked using the selected estimate.

29 Claims, 14 Drawing Sheets

U.S. PATENT DOCUMENTS

| | | | |
|---|---|---|---|
| 5,325,098 | A | 6/1994 | Blair et al. |
| 5,335,298 | A | 8/1994 | Hevenor et al. |
| 5,341,142 | A | 8/1994 | Ries et al. |
| 5,341,143 | A * | 8/1994 | Reis et al. .................. 342/64 |
| 5,422,828 | A | 6/1995 | Choate et al. |
| 5,479,525 | A | 12/1995 | Nakamura et al. |
| 5,602,760 | A * | 2/1997 | Chacon et al. ............ 382/103 |
| 5,647,015 | A | 7/1997 | Choate et al. |
| 5,651,512 | A | 7/1997 | Sand et al. |
| 5,809,171 | A | 9/1998 | Neff et al. |
| 5,870,486 | A | 2/1999 | Choate et al. |
| 5,878,163 | A * | 3/1999 | Stephan et al. ............ 382/172 |
| 5,947,413 | A | 9/1999 | Mahalanobis |
| 5,963,653 | A | 10/1999 | McNary et al. |
| 5,982,930 | A | 11/1999 | Neff et al. |
| 5,990,939 | A | 11/1999 | Sand et al. |
| 6,005,609 | A | 12/1999 | Cheong |
| 6,031,568 | A | 2/2000 | Wakitania |
| 6,042,050 | A | 3/2000 | Sims et al. |
| 6,055,334 | A | 4/2000 | Kato |
| 6,079,862 | A | 6/2000 | Kawashima et al. |
| 6,298,170 | B1 * | 10/2001 | Morita et al. ............... 382/278 |
| 6,502,082 | B1 * | 12/2002 | Toyama et al. ............. 706/16 |
| 7,035,764 | B2 * | 4/2006 | Rui et al. .................... 702/179 |

OTHER PUBLICATIONS

*Maneuvering Target Tracking by Using Image Processing Photosensor*, Sergey L. Vinogradov, Paper No. 2561-20, SPIE Proceedings vol. 2561, Signal and Data Processing of Small Targets, pp. 210-219, 1995, ISBN 0 8194 1920 6.

*Long-Range Automatic Detection of Small Targets in Sequence of Noisy Thermal Infrared Images*, Dirk Borghys and Marc B. Acheroy, Paper No. 2235-60, SPIE Proceedings vol. 2235, Signal and Data Processing of Small Targets, pp. 264-275, 1994, ISBN 0 8194 1539 1.

*Feature-Based Tracking and Recognition for Remote Sensing*, Curtis Padgett and David Q. Zhu, Paper No. 2466-05, SPIE Proceedings vol. 2466, Space Guidance, Control and Tracking II, pp. 41-50, 1995, ISBN 0 8194 1819 6.

Marshall W C: "Nonlinear Adaptive Filter for Closed-Loop Fire Control" Optical Engineering, Soc. of Photo-Optical Instrumentation Engineers. Bellingham, US, vol. 30, No. 2, Feb. 1, 1991, pp. 189-194, XP 000173775.

Sanders-Reed J N et al: "Multi-target tracking in clutter" Proceedings of the SPIE, SPIE, Billinigham, VA, US, vol. 4724, Apr. 2002, pp. 30-36, XP 002467718.

Olson T. L. P. et al: "Real-time multistage IR image-based tracker" Proceedings of the SPIE—The International Society for Optical Engineering SPIE-Int. Soc. Opt. Eng USA, vol. 3692, 1999, pp. 226-233, XP 001091455.

European Search Report for Application No. 04018554.8-1522, dated Apr. 8, 2008.

Beymer D et al., "Tracking Vehicles in Congested Traffic" Intelligent Vehicles Symposium, IEEE, 1996, pp. 130-135, XP 010209723.

Burns J B et al., "Extracting Straight Lines" IEEE Transactions on Pattern Analysis and Machine Intelligence, 1986, vol. Pami-8, No. 4, pp. 425-455, XP 001016046.

Chown T et al., "Image Analysis By Enhanced Facet Modelling" 1989, pp. 1655-1658, XP 010082907.

Lee H C et al., "Target Recognition and Tracking in an Infrared System" Proceedings of the SPIE—The International Society for Optical Engineering Spie-Int, 2001, vol. 4365, pp. 88-92, XP 002482830.

Tsaig Y et al., "A Region-Based MRF Model for Unsupervised Segmentation of Moving Objects" Proceedings 2001, IEEE Conference on Computer Vision and Pattern Recognition, 2001, vol. 1, pp. 889-896, XP 010583839.

Wang C et al., "Multi-Model SAR Image Despeckling" Electronics Letters, 2002, vol. 38, No. 23, pp. 1425-1426, XP 006019204.

European Search Report for Application No. 04018554.8-1522, dated Jun. 18, 2008.

* cited by examiner

METHOD AND APPARATUS FOR TRACKING AN OBJECT

BACKGROUND

1. Field of Invention

The present invention relates to processing of image data. More particularly, the present invention relates to a method and apparatus for tracking an object.

2. Background Information

Historically, reconnaissance information has provided important information used in planning military operations. For example, prior to the advent of photography, scouts would be sent out to collect information regarding natural resources such as lakes and rivers, enemy troop information and the like. With the advent of photography, these scouts would provide reconnaissance information by capturing a scene of enemy installations, battlefields, and the like, using photographs. As technology advances, new methods are provided for collecting reconnaissance information. For example, it is quite common today to have reconnaissance planes, manned or remotely controlled, or satellites capture a scene for reconnaissance purposes. In addition to conventional photographic techniques, a scene can be captured using infrared detectors and the like.

Typically scenes captured by reconnaissance techniques have been analyzed by humans in order to determine the content of the captured scene. For example, a human would analyze a photograph to determine the location of bodies of water, the location of enemy troops and the location of man-made objects such as buildings and lines of communication. The human who analyzed the photograph would then have to relay the determined information to people in the field, for example, to an airplane pilot in order to identify objects. However, using humans to analyze photographs is very labor intensive. Further, there can be a considerable delay between the time when a scene is captured and the time in which the information in the captured scene is relayed to persons in the field.

SUMMARY OF THE INVENTION

In accordance with one embodiment of the present invention, a method and apparatus for tracking an image are provided. An image of a scene comprising an object is received. The image is processed with a first tracker to produce a first estimate of a position of the object in the image and a first confidence value. The image is processed with a second tracker to produce a second estimate of the position of the object in the image and a second confidence value. The second tracker processes the image concurrently with the first tracker. An estimate of the position of the object in the image is selected using the first and second confidence values. The object is then tracked using the selected estimate.

In accordance with another aspect of the present invention, a method and apparatus are provided for tracking an object. A first tracker receives an image and outputs a first estimate of a position of an object in the image and an associated first confidence value. A second tracker receives the image and outputs a second estimate of a position of the object in the image and an associated second confidence value. The second tracker processes the image concurrently with the first tracker. An output selector selects an estimate of the position of the object in the image using the first and second confidence values.

BRIEF DESCRIPTION OF THE DRAWINGS

Other objects and advantages of the invention will become apparent to those skilled in the art upon reading the following detailed description of preferred embodiments, in conjunction with the accompanying drawings, wherein like reference numerals have been used to designate like elements, and wherein.

DETAILED DESCRIPTION

Figure 1:
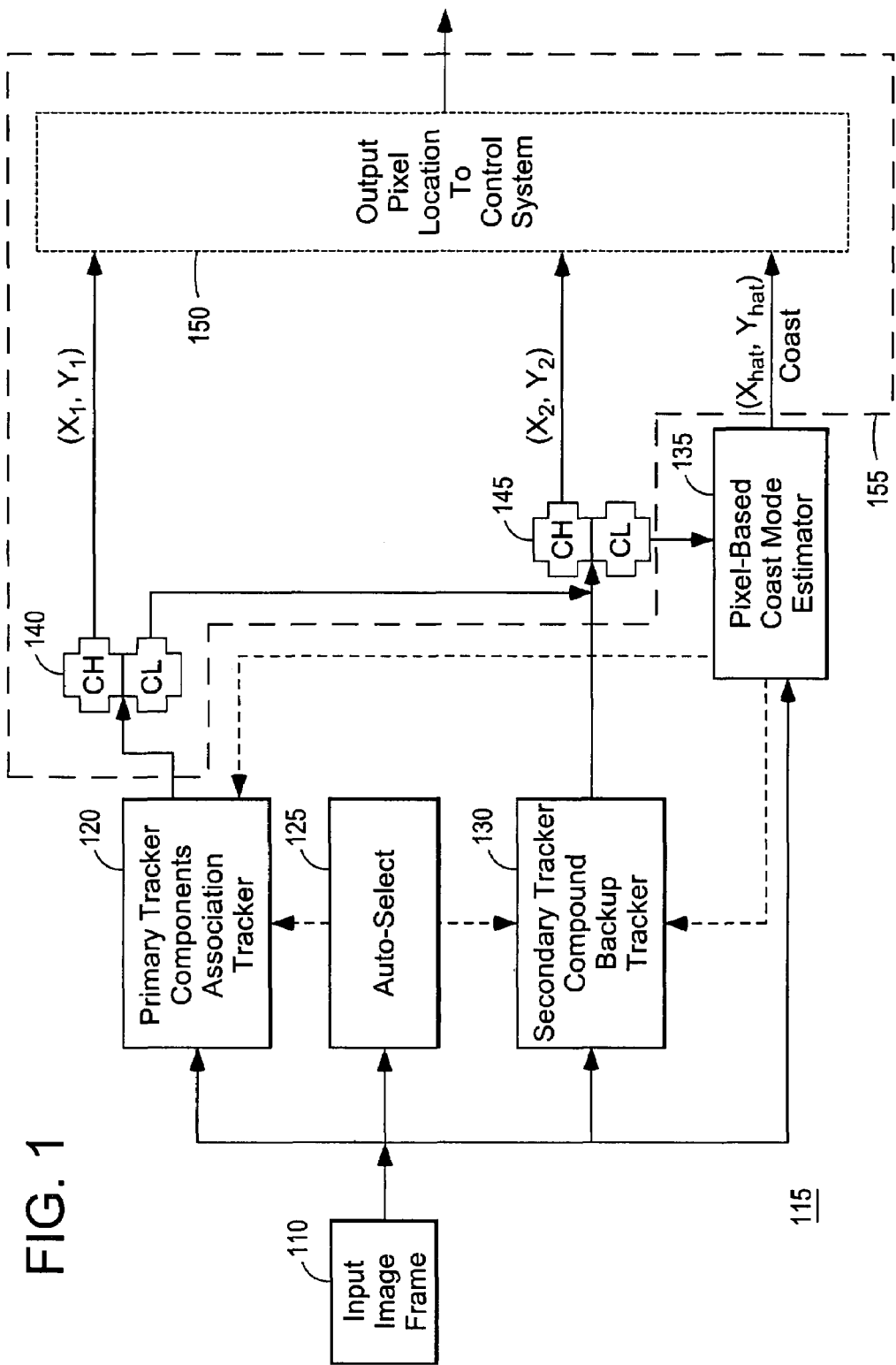
FIG. 1 illustrates an exemplary tracking system in accordance with the present invention.

FIG. 1 illustrates an exemplary tracking system in accordance with the present invention. An input image frame 110 is received by tracking system 115. The tracking system 115 comprises a primary tracker 120, an auto-select function 125, a secondary tracker 130, a pixel-based coast mode estimator 135, output logic elements 140 and 145, and output pixel location to control system function 150.

An input image frame 110 is provided to primary tracker 120, auto-select function 125, secondary tracker 130 and pixel-based coast mode estimator 135. Auto-select function 125 is used to initialize primary tracker 120 and secondary tracker 130. After initialization, the primary tracker 120 and secondary tracker 130 will concurrently process a received input image frame 110, and each will output an estimate ($X_1$, $Y_1$) and ($X_2$, $Y_2$), respectively, of a position of an object in the input image frame 115 and an associated confidence value. Similarly, pixel-based coast mode estimator 135 outputs a third estimate ($X_{hat}$, $Y_{hat}$), of the position of the object in the image. The selection of which estimate of the estimates ($X_1$, $Y_1$), ($X_2$, $Y_2$) and ($X_{hat}$, $Y_{hat}$) to output to a control system is determined using logic elements 140 and 145, and output pixel location to control system function 150, which are collectively referred to as an output selector 155. Although illustrated as distinct elements, logic elements 140 and 145, and output pixel location to control system function 150 can be components of the output selector 155, and can be performed with other arrangements of logic and output elements either in software or hardware.

In accordance with exemplary embodiments of the present invention, primary tracker 120 is a components association tracker (CAT), the functioning of which is described in more detail below. The auto-select function 125 performs segmenting to provide an estimate of the position of the object in the image and the size of the object in the image to primary and secondary trackers 120 and 130. Secondary tracker 130 is a compound backup tracker (CBT) which employs two or more different trackers, one of which is selected based upon a distance to the object. Pixel-based coast mode estimator 135 operates in a similar manner to a conventional target state estimator, as will be described in more detail below.

The output selector 155 will select the estimate $(X_1, Y_1)$ of the position of the object in the input image frame 110 from the primary tracker 120 if the outputted confidence level is high (CH output of element 140). If the primary tracker 120 is not producing a high confidence value (CL output of element 140), then it is determined whether the secondary tracker 130 is providing a high confidence output. If the secondary tracker 130 is providing a high confidence output (CH output of element 145), then the estimate $(X_2, Y_2)$ of the object's position in the input image frame 110 provided by secondary tracker 130 is provided to the control system. If, however, the primary and secondary trackers 120 and 130, respectively, are not producing a high confidence estimate (CL output of element 145), then the pixel-based coast mode estimator 135 provides an estimate $(X_{hat}, Y_{hat})$ of the position of the object in the input image frame 110 which is provided to the control system. When primary tracker 120 and/or secondary tracker 130 are not providing a high confidence output, auto-select function 125 is used for reinitializing the tracker(s) producing the low confidence output.

Figure 2:
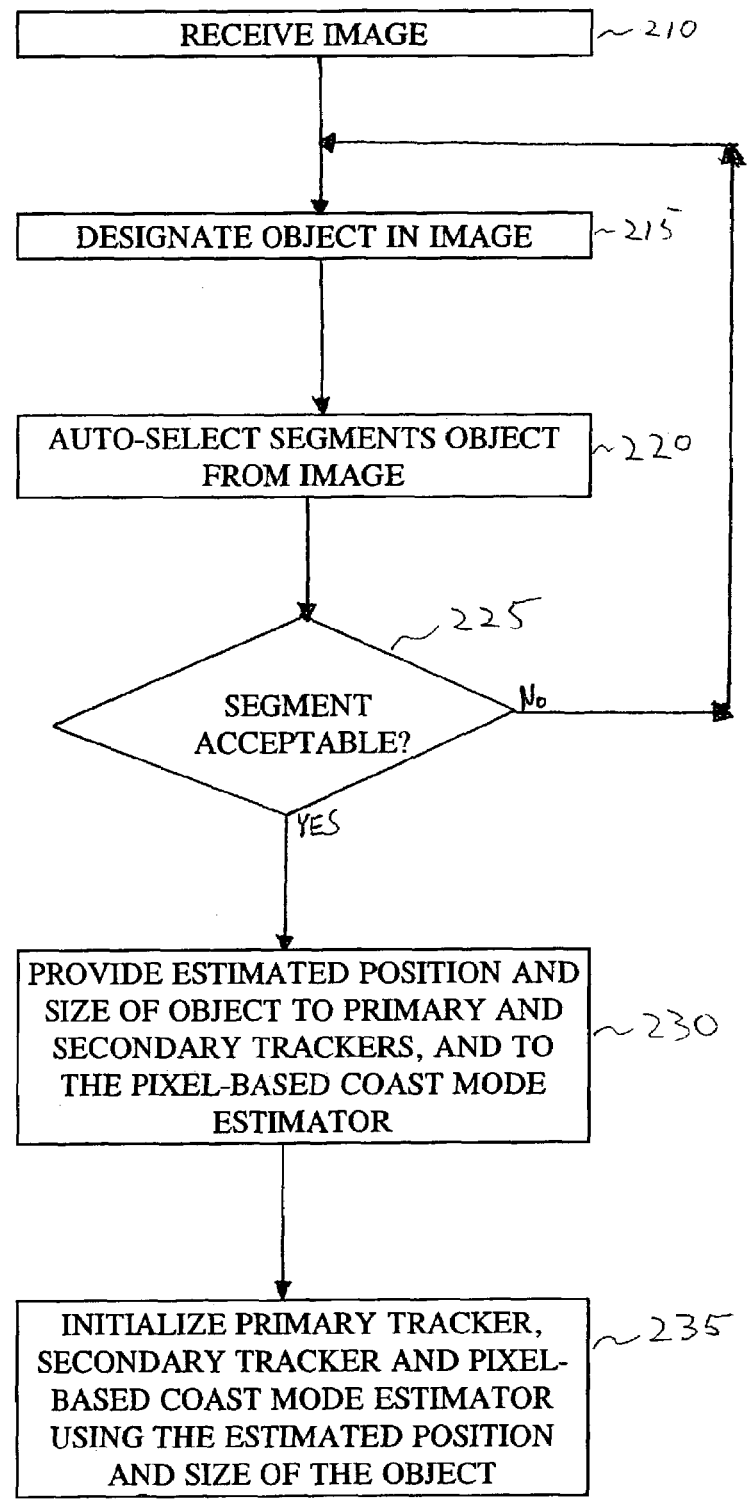
FIG. 2 illustrates an exemplary method for initializing the tracking system in accordance with exemplary embodiments of the present invention.

FIG. 2 illustrates an exemplary method for initialization of a tracking system, such as the tracking system 115, illustrated in FIG. 1, in accordance with exemplary embodiments of the present invention. An input image frame is received (step 210) and an object in the image is designated (step 215). In accordance with one embodiment of the present invention, an operator of the tracking system designates the object by placing cross-hairs near or directly on the object in the image. In accordance with other embodiments of the present invention, if a lock-on-after-launch scenario is desired, the designation of the object in the image can be automated. Using the designated object in the image, the auto-select function segments the object from the image (step 220) and it is determined whether the segment is acceptable (step 225). The determination of whether the segment is acceptable can be performed by a user or can be automated. If the segment is not acceptable ("NO" path out of decision step 225), then the object in the image is designated again (step 215). If, however, the segment is acceptable ("YES" path out of decision step 225), then the estimated position and size of the object is provided to the primary and secondary trackers, and to the pixel-based coast mode estimator (step 230). The primary tracker, secondary tracker and pixel-based coast mode estimator are initialized using the estimated position and size of the object (step 235).

Figure 3A:
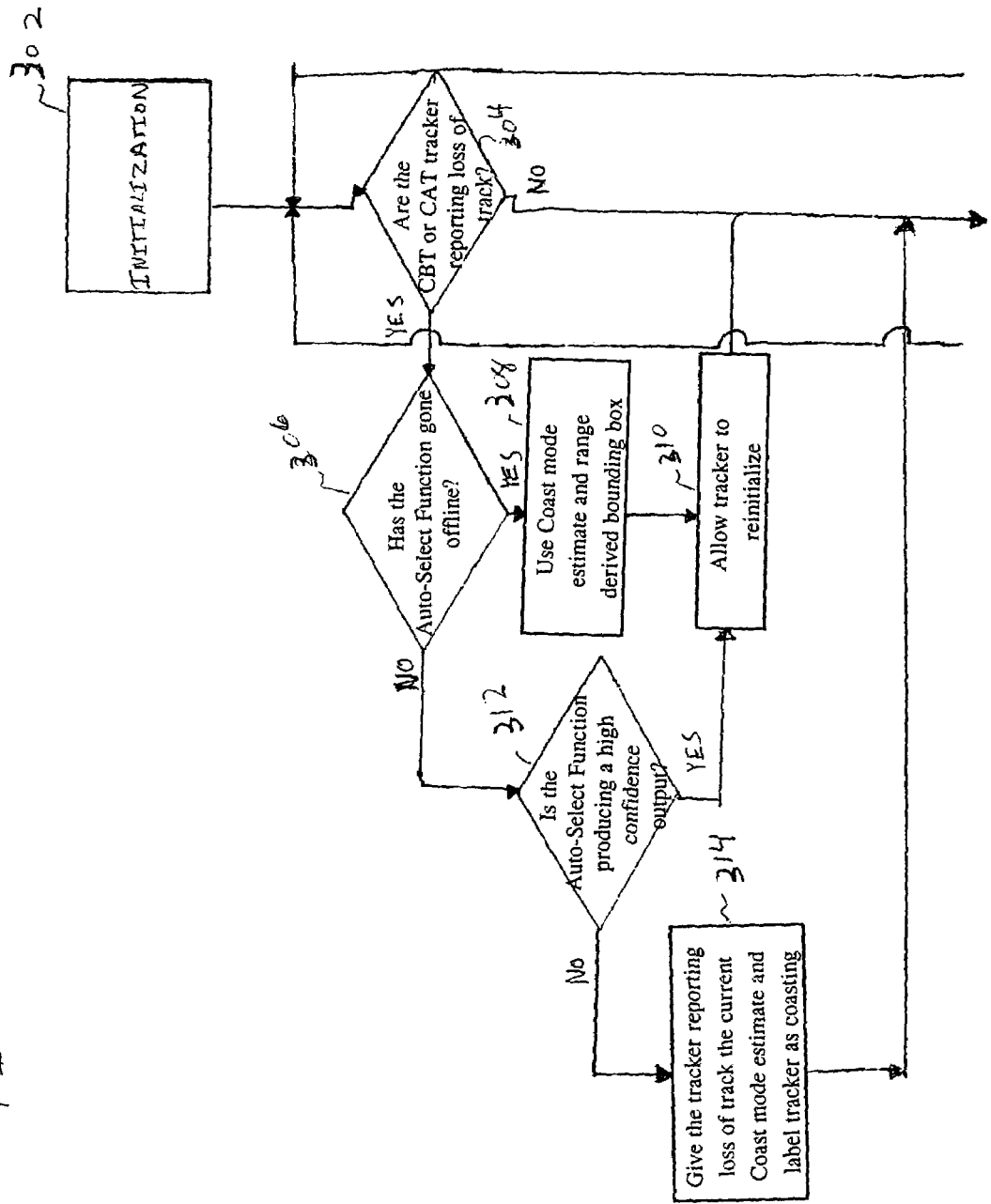
FIGS. 3A-3C illustrate and exemplary method for tracking an object in accordance with the present invention.
Figure 3B:
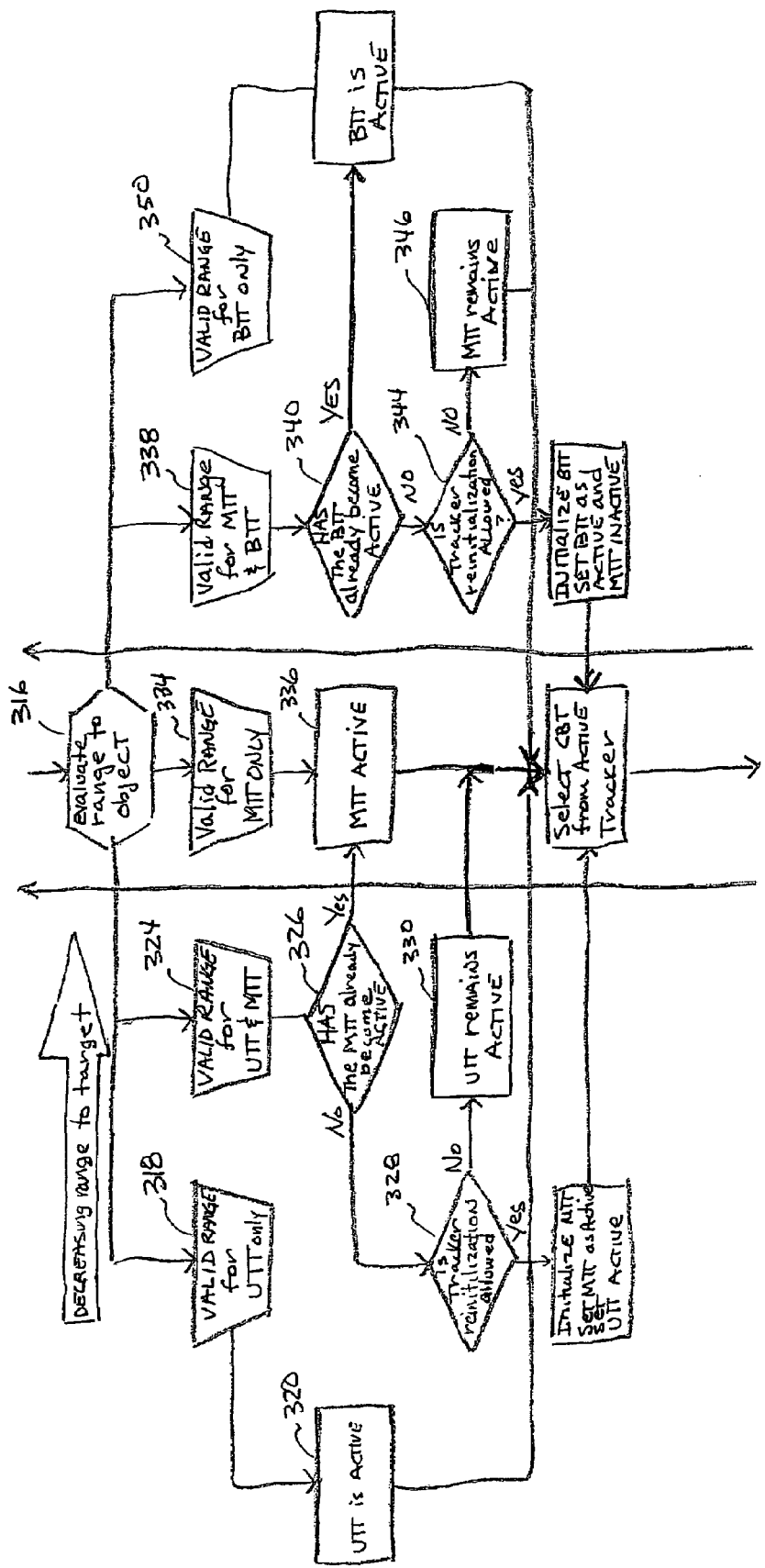
Figure 3C:
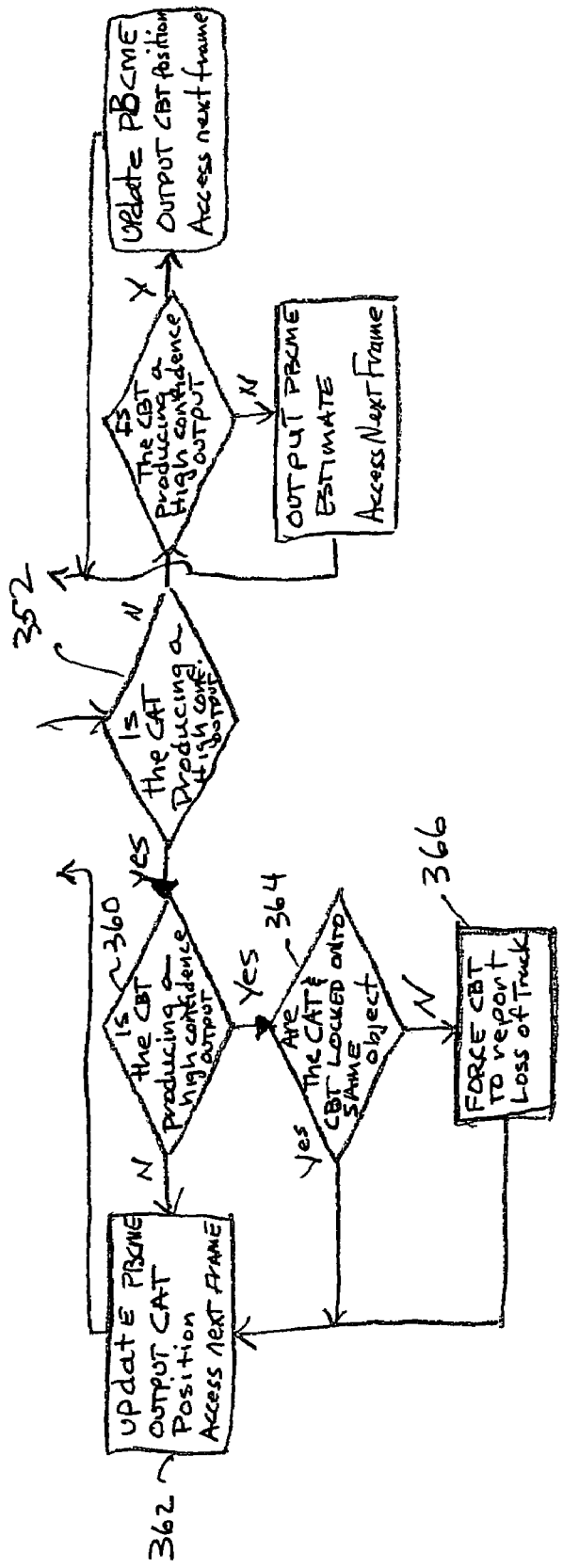

FIGS. 3A-3C illustrate an exemplary method for a tracking system, such as the tracking system 115, illustrated in FIG. 1, in accordance with the present invention. After initialization (step 302), a determination is made whether the secondary tracker (CBT) or the primary tracker (CAT) are reporting a loss of track (step 304). If either the primary or secondary tracker is reporting a loss of track ("YES" path out of decision step 304), then it is determined whether the auto-select function has gone offline (step 306). If the auto-select function has gone offline ("YES" path out of decision step 306), the position estimate and range derived bounding box provided by the pixel-based coast mode estimator is used to reinitialize the tracker which has reported a loss of track (steps 308 and 310).

If the auto-select function has not gone offline ("NO" path out of decision step 306), then it is determined whether the auto-select function is producing a high-confidence output (step 312). If the auto-select function is producing a high confidence output ("YES" path out of decision step 312), then the tracker which has reported a loss of track is reinitialized using the output of the auto-select function (step 310). If the auto-select function is not producing a high confidence output ("NO" path out of decision step 312), then the tracker reporting a loss of track is provided with the current estimate output by the pixel-based coast mode estimator and the tracker is labeled as coasting (step 314).

If the primary and secondary trackers are not reporting a loss of track ("NO" path out of decision step 304), after the tracker which reported the loss of track has reinitialized (step 310), or after the tracker has been labeled as coasting (step 314), the range to the object is evaluated (step 316). As discussed above, the compound backup tracker comprises two or more trackers from which an output is selected based upon a range to an object.

In accordance with exemplary embodiments of the present invention, the compound backup tracker comprises an unresolved target tracker (UTT), a magnitude template tracker (MTT) and a balanced template tracker (BTT). The ranges used for selecting one of the three trackers which comprise the compound backup tracker overlap to ensure that the new tracker has a good track on the object before handing the tracking off from one tracker to another in the compound backup tracker. Accordingly, if the range to the object is a range which is valid for the unresolved template tracker only (step 318), then the unresolved template tracker tracks the object and provides the output of the compound backup tracker (steps 320 and 322).

If it is determined that the range to the object is a valid range for both the unresolved template tracker and the magnitude template tracker (step 224), then it is determined whether the magnitude template tracker has already become active and has a good track on the object (step 326). If the magnitude template tracker has not already become active ("NO" path out of decision step 326), then it is determined whether tracker reinitialization is allowed (step 328). If tracker reinitialization is not allowed ("NO" path out of decision step 328), then the unresolved target tracker remains active (step 330). If, however, tracker reinitialization is allowed ("YES" path out of decision step 328), then the magnitude template tracker is initialized, set as the active tracker, and the unresolved target tracker is set as inactive (step 332). After the unresolved target tracker remains active (step 330), or after the magnitude template tracker has been reinitialized and is active (step 332), the compound backup tracker output is selected from the active tracker (step 322).

If the range to the object is a range valid for the magnitude template tracker only (step 334), then the magnitude template tracker is active (step 336), and its output is selected by the compound backup tracker (step 322).

If the range to the object is valid for both the magnitude template tracker and the balanced template tracker (step 338), then it is determined whether the balanced template tracker has already become active (step 340). If the balanced template tracker has already become active ("YES" path out of decision step 340), then the balanced template tracker is active (step 342), and its output is selected as the output of the compound backup tracker (step 322). If, however, the balanced template tracker has not already become active ("NO" path out of decision step 340), then it is determined whether tracker reinitialization is allowed (step 344). If tracker reinitialization is not allowed ("NO" path out of decision step 344), then the magnitude template tracker remains active (step 346) and its output is selected as the output of the compound backup tracker (step 322). If, however, the tracker reinitialization is allowed ("YES" path out of decision step 344), then the balanced template tracker is initialized and set as active, and the magnitude template tracker is set as inactive (step 348). The balanced template tracker is then selected as the output of the compound backup tracker (step 322).

If the range to the object is a valid range for the balanced template tracker only (step 350), then the balanced template tracker is active (step 342) and its output is selected as the output of the compound backup tracker (step 322).

After a tracker output has been selected for the compound backup tracker (step 322), then it is determined whether the components association tracker (the primary tracker) is producing a high confidence output (step 352). If the components association tracker is not producing a high confidence output ("NO" path out of decision step 352), then it is determined whether the compound backup tracker is producing a high confidence output (step 354). If the compound backup tracker is producing a high confidence output ("YES" path out of decision step 354), then the pixel-based coast mode estimator (PBCME) is updated, the compound backup tracker position estimate is output, the next image frame is accessed (step 356), and evaluation of the next image frame is performed. If, however, the compound backup tracker is not producing a high confidence output ("NO" path out of decision step 354), then the pixel-based coast mode estimator's estimate is output from the tracker, the next image frame is accessed (step 358), and processing of the next image frame is performed.

If the components association tracker is producing a high confidence output ("YES" path out of decision step 352), then it is determined whether the compound backup tracker is producing a high confidence output (step 360). If the compound backup tracker is not producing a high confidence output ("NO" path out of decision step 360), then the pixel-based coast estimator is updated, the position output by the components association tracker is output, the next frame is accessed (step 362), and the next image frame is processed.

If the compound backup tracker is producing a high confidence output ("YES" path out of decision step 360), then it is determined whether the components association tracker and the compound backup tracker are locked onto the same object (step 364). If the components association tracker and the compound backup tracker are locked onto the same object ("YES" path out of decision 364), then the pixel based coast mode estimator is updated, the component association tracker's estimated position is output, the next image frame is accessed (step 362), and the next image frame is processed. If, however, the component association tracker and the compound backup tracker are not locked onto the same object ("NO" path out of decision step 364), then the compound backup tracker reports a loss of track (step 366), the pixel-based coast mode estimator is updated, the component association tracker's position estimate is output, the next image frame is accessed (step 362), and the next image frame is processed.

Figure 4A:
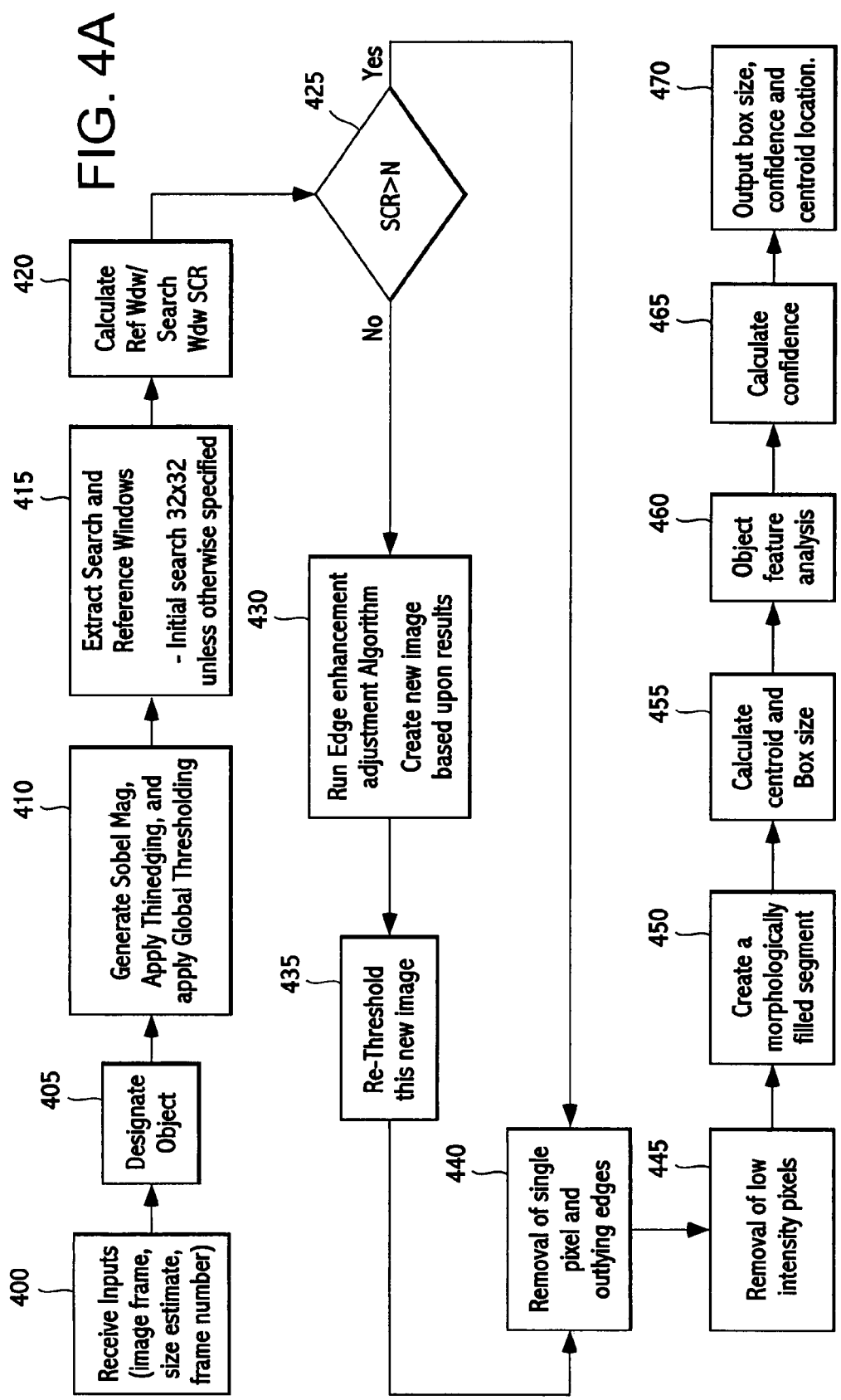
FIG. 4A illustrates an exemplary method for an auto-select function in accordance with exemplary embodiments of the present invention.

FIG. 4A illustrates a method performed by the auto-select function. In accordance with exemplary embodiments of the present invention, the auto-select function receives an input image frame, an estimate of the position of the object in the image, an estimate of the object's current size (e.g., in the horizontal direction), and the input image frame number. The auto-select function processes the inputs, as described herein in conjunction with FIGS. 5A-5G, and outputs the size and location of the object in the image, as well as a confidence measure of the estimate. In accordance with exemplary embodiments of the present invention, the size of the object is output by the auto-select function in the form of the height and width of the object.

Figure 5D:
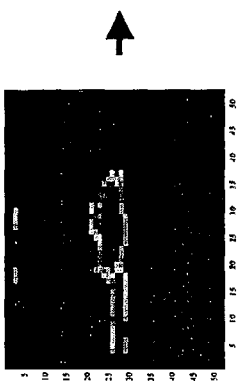
FIGS. 5A-5G illustrates the application of the auto-select function to an image in accordance with exemplary embodiments of the present invention.
Figure 5G:
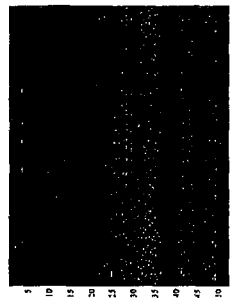
Figure 5C:
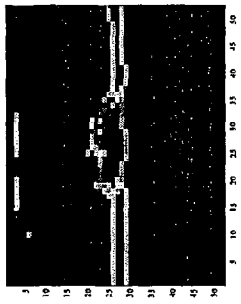
Figure 5F:
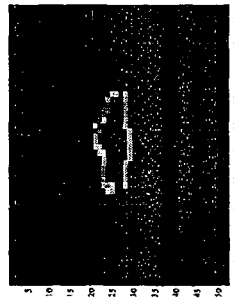
Figure 5B:
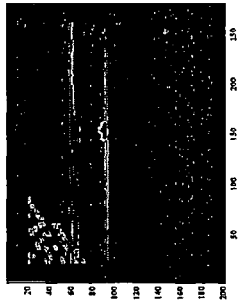
Figure 5E:
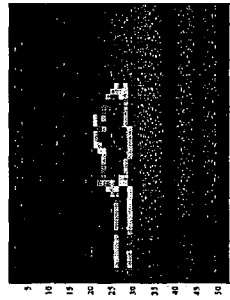
Figure 5A:
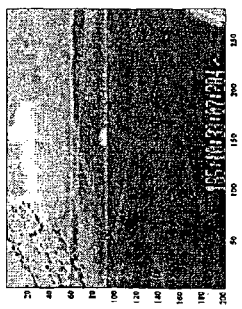

FIGS. 5A-5G illustrate resulting images based upon the processing performed by the auto-select function. Accordingly, the method of FIG. 4A will be described in connection with the images illustrated in FIGS. 5A-5G. Initially, an input image is received by the auto-select function (step 400), and an object in the image is designated (step 405). FIG. 5A illustrates an exemplary input image containing an object. Next a gradient operator (e.g., "Sobel Mag") is applied to the input image to produce a gradient magnitude image (step 410), as illustrated in FIG. 5B. In order to sharpen the edges in the gradient magnitude image, an edge thinning routine (e.g., "Thinedging") is applied to the gradient magnitude image. Specifically, for each gradient direction, the edge thinning routine examines the pixels to the right and left, e.g., .+−.90.degree. with respect to the edge direction. If the edge direction being processed is greater than either of the neighbor pixels, the gradient magnitude is retained in the gradient magnitude image. Otherwise, the pixel is set to zero in the gradient magnitude image. The image is then thresholded by a gradient magnitude threshold (e.g., "Global Thresholding"). In accordance with exemplary embodiments of the present invention, the gradient magnitude threshold is set such that only the upper 5% of all gradient magnitude values are retained, and the remaining 95% are set to zero.

Search and reference windows centered around the designated objects are determined. In accordance with exemplary embodiments of the present invention, the reference window is ½ the size of the search window (e.g., 32×32). Next, the search and reference windows are extracted from the image (step 415). FIG. 5C illustrates an exemplary search window. Using the extracted search and reference windows, a signal-to-clutter ratio (SCR) is calculated (step 420). Prior to the calculation of the signal-to-clutter ratio, the pixels of the reference window are normalized, and the pixels of the search window, excluding the reference window, are normalized. The signal-to-clutter ratio is then calculated by dividing the normalized pixels of the reference window by the normalized pixels of the search window excluding the reference window. The normalization of the pixels can be based upon the gradient magnitude intensity values of the pixels. Alternatively, the thresholded image can be considered as a binary image where if a pixel is "on" it is equal to 1, and if the pixel is "off" it is equal to zero. The calculated signal-to-clutter ratio is compared to a predetermined value N (step 425). The predetermined value N is selected to determine whether an edge enhancement routine should be performed on the image. Based upon empirical observations, the predetermined value N can be 20. However, other values can also be used.

If the signal-to-clutter ratio is not greater than the predetermined value N ("NO" path out of decision step 425), an edge enhancement routine is performed to generate a new image (step 430). Initially, the image is modified so that its dynamic range is within a predetermined range, e.g., between 0 and 255. Next, a maximum intensity bound (MAB) and a minimum intensity bound (MIB) value is calculated for the image. The MIB is determined by finding a pixel in the thresholded image which has the smallest intensity value not equal to zero. The MAB is determined by zeroing out all but the upper 5% of the pixels in the gradient magnitude image based upon intensity values. The value of a pixel in this thresholded image which has the smallest intensity value greater than zero is selected as the MAB.

The MAB and the MIB are employed to determine an intensity range that a lookup table will be broken up into. Specifically, the intensity range LUT_Interval_Range (LUTIR) is calculated as follows:

$$\text{LUT\_Interval}_{13}\text{Range(LUTIR)} = \text{round}(MAB-MIB)/10 \tag{1}$$

The lookup table is constructed as follows:

| Current Pixel Intensity Value (CPIV) | LUT Value (LT) |
|---|---|
| 1:MIB | 1 |
| MIB + 1:MIB + 1 + LUTIR | 6 |
| MIB + 2_LUTIR:MIB + 2 + LUTIR*2 | 16 |
| MIB + 3 + LUTIR*2:MIB + 3 + LUTIR*3 | 31 |
| MIB + 4 + LUTIR*3:MIB + 4 + LUTIR*4 | 51 |
| MIB + 5 + LUTIR*4:MIB + 5 + LUTIR*5 | 76 |
| MIB + 6 + LUTIR*5:MIB + 6 + LUTIR*6 | 106 |
| MIB + 7 + LUTIR*6:MIB + 7 + LUTIR*7 | 141 |
| MIB + 8 + LUTIR*7:MAB | 181 |
| MAB + 1:255 | 226 |

The lookup table is employed for multiplying each pixel intensity value in the image by the corresponding value from the lookup table. The multiplication produces an image where more persistent edges are enhanced compared to less persistent edges. FIG. 5D illustrates the search window after performing edge enhancement.

Once the gradient magnitude image has gone through the edge enhancement process, the image is further thresholded before going into the edge segment rejection process (Step 435). The basic purpose behind thresholding the gradient magnitude image now is to remove all low intensity pixels that are in the image. This is accomplished one of two ways depending upon if the gradient magnitude image was edge enhanced or not. Both techniques begin the same way though. The following routine is run on the search window gradient magnitude image.

Initially, the search window gradient magnitude image is employed to create an object box with the following characteristics: 1. its size is based upon the predicted object size value passed into the function; and 2. it is centered on the center pixel of the search window gradient magnitude image. Once the object box has been created the following statistics are determined. For any pixels whose intensity values are greater than zero, the standard deviation and median values for the object box are calculated. It is assumed that any pixels within the object box are part of the object and thus should be counted when determining the threshold value. Then the threshold value is calculated by the following series of equations:

$$\text{Threshold value} = \text{median value} - \text{STD value} \tag{2}$$

If Threshold_value < 0

Threshold value = median value − (.5 * STD value)

If Threshold_value < 0

Threshold value = median value

This threshold value is then passed back to the main function where it is used to threshold the imagery. For the first ten frames of data this calculated threshold value is used. After ten frames of data have occurred, the previous nine threshold values and the current one are averaged together to create the threshold value. This is to limit any sudden intensity fluctuations from corrupting the thresholding process. Once, the threshold value is calculated it is then used to help remove any low intensity pixels from the search window gradient magnitude image. The threshold value that is used for each frame is then determined using the following logic structure:

If frame number < 10 \qquad (3)

threshold value (current frame) = threshold value (current frame)

If frame number >= 10 threshold value (current frame) = The average threshold value of the last ten calculated threshold values including the current frame.

The threshold value is used one of two ways. If the edge enhancement routine was not performed then the search window gradient magnitude image is thresholded by the calculated threshold value. However, if the edge enhancement routine was run, then the following process is used to threshold the edge enhanced image. First, the edge enhanced image pixels are sorted lowest to highest based upon their intensity. Next, the calculated threshold value is subtracted from each of the sorted array pixel values. All the vector locations where the pixel value remains above zero are found. Finally, in the revised sorted vector array find the vector location that has the minimal value. The value at the location in the original vector array is determined to be the threshold value.

$$\text{New Threshold Value} = \text{original vector array}(x) \tag{4}$$

Finally, the enhanced image is thresholded using the new calculated threshold value.

If the signal-to-clutter ratio is greater than a predetermined value N ("YES" path out of decision step 425), or after re-thresholding the enhanced edge image (step 435) then single pixel and outlying edges are removed (step 440). The removal of single pixel outlying edges operates on a binary version of the image, and hence the image is initially converted to a binary image. The removal of outlying edges begins with a horizontal edge removal process which involves two tests. Initially, a box is centered upon the center of the search window image and is ½ the size of the search window image. Edge segments outside the box with a height less than 2 pixels across its x component length are eliminated. Edge segments that do fall within the predicted object box size are subjected to a much more stringent horizontal edge removal test. In this test if the edge segment has a height of 1 pixel across its x component length and has a width greater than the predicted object box size then it will be eliminated.

For all other edge segments that have not been previously tested, a vertical edge removal test is performed. If the edge segment's centroid position falls outside the predicted object box size then it will also be eliminated. For all remaining edge segments, an edge direction validation test is performed. For each edge segment its horizontal endpoints are calculated. If one of an edge segments endpoint falls within two pixels of the edge of the search window image and is made up of less than two directions then it is eliminated. If both endpoints of an edge segment fall within two pixels of the edge of the search window image and it is made up of less than three directions then it is also eliminated. If all the edges are removed by the above tests then all edges that are closest to the center of the search window will be restored. The main cause for the total removal of all edges would be if the object made a large unexpected movement in one of the directions or if the predicted location of the object was wrong. Since the auto-select works on a predicted location if this predicted location is off then the auto-select will be off. FIG. 5E illustrates the image after removal of outlying edges.

Next, low intensity pixels are removed from the image (step 445). The removal of low intensity pixels involves determining a threshold from a search window image and applying the threshold to the entire image such that any pixel below the threshold value is removed from the entire image. The threshold value is calculated using gradient magnitude values within the reference window which are greater than zero. Specifically, a standard deviation value and a median value of these gradient magnitude values are calculated. The threshold value is then determined by subtracting half of the standard deviation value from the median value, and the threshold is applied to the image. FIG. 5F illustrates the image after low intensity pixels have been removed.

After the removal of the low intensity pixels, a morphologically filled segment is created (step 450). This involves converting the gradient magnitude image to a binary image and operating on the binary image with a morphological segmenter. Specifically, a fill operation is performed by applying a dilate operation for several iterations and then applying in a erode operation for an equal number of iterations. The number of iterations that are applied can be determined by dividing the object's horizontal length by four. The dilate operation consists of setting each pixel that has one of its eight neighbors which has a value of one, to one. If none of the eight neighbors has a binary value of one, the pixel is set to zero. The erode operation consists of selling equal to one a pixel for which all eight neighbors and itself are set to one.

Otherwise, the pixel is set to zero. FIG. 5G illustrates the image after the creation of the morphologically filled segment.

A centroid and box size of the morphologically filled segment is determined (step 455). Initially the segments' centroid position is calculated as follows:

$$\text{row}=\text{ceil}((\text{Max\_Vert\_Pixel}+\text{Min\_Vert\_Pixel})/2) \quad (5)$$

$$\text{col}=\text{ceil}((\text{Max\_Horz\_Pixel}+\text{Min\_Horz\_Pixel})/2) \quad (6)$$

where Max_Horz_Pixel and Min_Horz_Pixel are the pixel coordinates of the largest and smallest horizontal pixel coordinates of the morphological filled segment, respectively; and Max_Vert_Pixel and Min_Vert_Pixel are the pixel coordinates of the largest and smallest vertical pixel coordinates of the morphologically filled segment, respectively. All the cleaned edge image pixels (x,y) are saved in the following variables:

$$\text{Edge\_img2\_row\_pos}=y \text{ location of all pixels} \quad (7)$$

$$\text{Edge\_img2\_col\_pos}=x \text{ location of all pixels} \quad (8)$$

It should be noted that these (x,y) location values need to be modified to represent the actual (x,y) location in the full size imagery instead of the search window image.

The determination of the object's box size is performed by calculating the maximum extent of the pixels in the horizontal and vertical directions. It should be noted that as an output the tracker expects the box size values to be the true values, but the internal auto-select calculations use ½ the true object box size values. Therefore, the object's box size once calculated will be broken up into width and height values that are ½ their true values. Thus, before the object box size is passed to the tracker the object size values will have to be doubled. This is done after the auto-select is completed. Secondly, if the morphologically filled segment image does not contain an object or if the object Lsize or Tsize calculation yields a value of less than 3, then they are set equal to 3. The horizontal size (Horz_size), the vertical size (Vert_size), the (Lsize), and the (Tsize) are calculated as follows:

$$\text{Horz\_size}=(\text{Max\_Horz\_Pixel}-\text{Min\_Horz}_{\_Pixel})+1 \quad (9)$$

$$L\text{size}=\text{ceil}((\text{Horz\_size}+2)/2) \quad (10)$$

$$\text{Vert\_size}=(\text{Max\_Vert\_Pixel}-\text{Min\_Vert\_Pixel})+1 \quad (11)$$

$$T\text{size}=\text{ceil}((\text{Vert\_size}+2)/2) \quad (12)$$

After the object's width and height has been determined the object width to height ratio is calculated as follows:

$$\begin{aligned}
&\text{if frame number} > 1 \\
&\textit{objectsize ratio} = (L\textit{size}(previousvalues) / T\textit{size}(previousvalues)) \\
&\text{if } \textit{objectsize} \text{ ratio} > 2 \text{ or } \textit{objectsize} \text{ ratio} < .5 \\
&\textit{objectsize} \text{ ratio} = 2 \\
&\text{if } \textit{objectsize} \text{ ratio} < 1 \text{ and } \textit{objectsize} \text{ ratio} > .5 \\
&\textit{objectsize} \text{ ratio} = 1 / \textit{objectsize} \text{ ratio} \\
&\text{if frame number} > 10 \\
&\textit{objectsize ratio} = \text{sum}(L\textit{size}(\text{previous 10 values}) / T\textit{size}(\text{previous ten values})) \\
&\text{if } \textit{objectsize} \text{ ratio} > 2 \text{ or } \textit{objectsize} \text{ ratio} < .5 \\
&\textit{objectsizeratio} = 2 \\
&\text{if } \textit{objectsize} \text{ ratio} < 1 \text{ and } \textit{objectsize} \text{ ratio} > .5 \\
&\textit{objectsize} \text{ ratio} = 1 / \textit{objectsize} \text{ ratio}
\end{aligned} \quad (13)$$

Once the object's width to height ratio has been determined then a comparison test is performed between the Lsize, Tsize numbers and the predicted width and height values that were passed to the auto-select. Before this test occurs though it needs to be determined if the range to the object is valid or not. Furthermore, if the range is valid then different limits on the comparison testing need to be observed depending upon the uncertainty value associated with the range. This information is passed to the auto-select from the tracker. If the range is valid then the following comparison tests are performed:

if *objectrange* uncertainty <= .1   min_adj = .9;   (14)

max_adj = objectsize_ratio;

if *objectrange* uncertainty <= .2 min_adj = .8 max_adj = objectsize_ratio * 1.1;

if *objectrange* uncertainty <= .3 min_adj = .7 max_adj = objectsize_ratio * 1.2;

if Lsize < min_adj * Lsize_pred

Lsize = Lsize_pred if Lsize > max_adj * Tsize_pred

Lsize = Lsize_pred if Tsize < .min_adj * Tsize_pred

Tsize – Tsize_pred if Tsize > max_adj * Tsize_pred

Tsize – Tsize_pred

Otherwise, this above mentioned comparison tests are modified where range is not valid:

if *objectrange* uncertainty < +.1   (15)

min_adj = .7

Pmax_adjobjectsize_ratio * 1.2 if Lsize < min_adj * Lsize_pred

Lsize = Lsize_pred if Tsize < .min_adj * Tsize_pred

Lsize = Lsize_pred if Tsize < .min_adj * Tsize_pred

Tsize = Tsize_pred if Tsize > maxadj * Tsize_pred

Tsize = Tsize_pred

This test is performed to ensure that the calculated object width and height values are not excessively large or small. If they are then they are replaced by the predicted target width and height values that were passed into the auto-select from the tracker.

Next the object's area and perimeter values are determined as follows:

Object_Area=length(Find(MFS_image>0))   (16)

Object_Perimeter=length(Find(perimeter_image>0))   (17)

To form the perimeter image an erode operation is performed on the morphologically filled segment image, and the perimeter image is calculated as follows:

Perimeter_image=(MFS_image)–(Eroded_image)   (18)

Whenever the object's box size value, either the x or y or both is fixed, then the object's area and perimeter are found by the following equations:

Object_area=Lsize*Tsize   (19)

Object_perimeter=2*(Lsize+Tsize)   (20)

The confidence factor that the auto-select outputs is determined using a object feature analysis approach (step 460). The features used in this analysis is the object's calculated perimeter, area, compactness, and the segments edge directions. First a confidence measure for each feature is calculated and then they are combined to create the auto-select confidence measure.

The first two features to be evaluated are the object's area and perimeter. Once the object's area and perimeter values had been passed into the feature analysis function, then they are compared against range-based estimates of what the object area and perimeter should be. This is done to determine if any unusual object growth or shrinkage has occurred. Since only estimated range is available the following growth equations are used to develop the estimated area and perimeter values. These equations require a past history of 10 area and perimeter values. So, it is assumed that during the first ten frames of data the area and perimeter calculations are always correct.

Perimeter Equations inv_perimeter=1./perimter_values(1:10);   (21)

$xx\_p$=[1:Length(inv_perimeter1)]';   (22)

$pp\_p$=polyfit($xx\_p$,inv_perimeter,1);   (23)

$yy\_p=pp_p(1)*xx\_p+ppP(2)$;   (24)

positive_perimeter_growth=
    ceil((1./$yy\_p$(10)*0.1414)+1./$yy\_p$(10));   (25)

max_positive_perimeter_growth=
    ceil((1./$yy\_p$(10)*0.1732)*1./$yy\_p$(10));   (26)

negative_perimeter_growth=
    floor(1./$yy\_p$(10)–(1./$yy\_p$(10)*0.1414));   (27)

max_negative_perimeter_growth=
    floor(1./$yy\_p$(10)–(1./$yy\_p$(10)*0.1414));   (28)

Area Equations inv_area=sqrt(1./area_values(1:10));   (29)

$xx\_a$=[1:length(inv_area)]';   (30)

$pp\_a$+polyfit($xx\_a$,inv_area, 1);   (31)

$yy\_a=pp\_a(1)*xx\_a+pp\_a(2)$;   (32)

$yy\_a-(yy\_a)^{0.2}$;   (33)

positive_area_growth=
    ceil((1./$yy\_a$(10)*0.2)+1./$yy\_a$(10));   (34)

max_positive_area_growth=
    ceil((1./$yy\_a$(10)*0.3)+1./$yy\_a$(10));   (35)

negative_area_growth=
    floor(1./yy_a(10)−(1./yy_a(10)*0.2));             (36)

max_negative_area_growth=
    floor(1./yy_a(10)−(1./yy_a(10)*0.2))              (37)

Thus, for the first ten frames of data the confidence value for both the area and perimeter is set to 0.9. Once, the estimated area and perimeter values can be calculated then the remaining part of the confidence is calculated for the perimeter and area values. The method chosen to do this is to use the following equations, which are designed to output a gaussian curve;

$$\text{area\_conf}=e(-((\text{current\_area}-\text{center})/(\text{center}/2.4))^2) \quad (38)$$

$$\text{perm\_conf}=e(-((\text{current\_perimeter}-\text{center})/(\text{center}/2.4))^2) \quad (39)$$

The center value is calculated by the following equations

Center=round(neg_growth_perm+pos_growth_perm)/2)    (40)

Center=round(neg_growth_area+pos_growth_area)/2)    (41)

The equation that was developed to create the gaussian curve was generated from the range derived area and perimeter values and percentages that were determined through empirical analysis. While the gaussian curve may not always fall along these values in general it should be closes. These values are as follows:

| Area or Perimeter Value | Percentage |
|---|---|
| 0 | 0 |
| Center * 1.5 | .35 |
| Maximum positive area growth | .7 |
| Positive area growth | .8 |
| Center | 1 |
| Negative area growth | .7 |
| Maximum negative area growth | .8 |
| Center/1.5 | .35 |
| >Center * 2 | 0 |

Figure 4B:
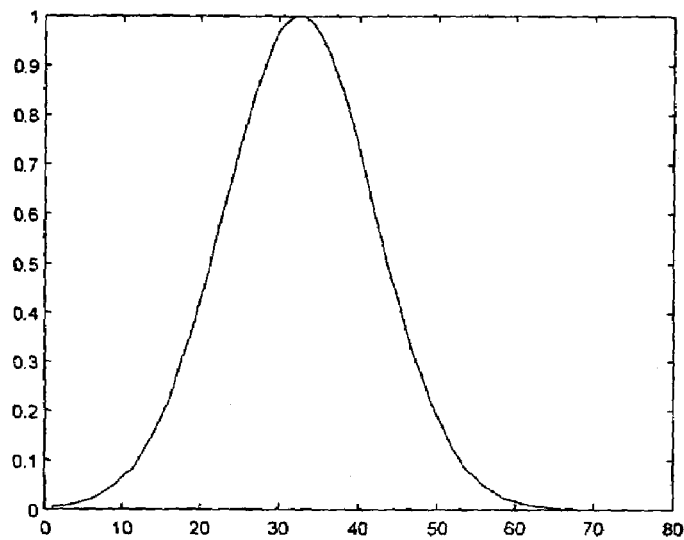
FIG. 4B illustrates an exemplary confidence spline curve for area and perimeter features of a target in accordance with the present invention.

The maximum confidence value is found at the center point of the gaussian curve. FIG. 4B illustrates an exemplary confidence spline data curve for the area and perimeter features of a target. Thus, if the area of an object equals 27 then the confidence that this object is a valid object would be around 85%. Similar results are also obtained for perimeter values.

The next feature to be examined is the object's compactness otherwise known as an object's $$\frac{(\text{perimeter})^2}{\text{area}}.$$

This feature measures the signature of the object and determines if it is made up of any undesirable features such as excessive length in comparison to height, attachments of external pixels to the object segments, etc. If the signature has the shape of a square, circle, or rectangle it will have a very favorable compactness measure. It just happens to be that military vehicles typical segmented profiles represent these shapes in infrared imagery. Thus, to calculate the confidence measure for the compactness feature, the following operations are performed on the morphologically filled segment image. A 2-D convolution operation is performed using a mask which is 3×3 with zeros in each corner and ones in all other pixels of the mask. The perimeter is calculated as follows:

Perimeter Image=sum (Binary Convolved Image−
    Detection Image)*Convolved Image              (42)

After creating this image then the perimeter and compactness are calculated as follows:

Perm=sum together all pixels values in Perimeter
    image                                         (43)

Comp=perm²/area                                   (44)

wherein the area is the Object_area calculated above.

Once the compactness value is calculated then the remaining part of the confidence can be calculated for the compactness values. The method chosen to do this is to use the following equations, which are designed to output an exponential curve that has been tuned to the following values:

| Compactness Value | Percentage |
|---|---|
| 1 | 1 |
| 15 | 1 |
| 23 | .95 |
| 30 | .8 |
| 38 | .3 |
| >50 | .05 |

Figure 4C:
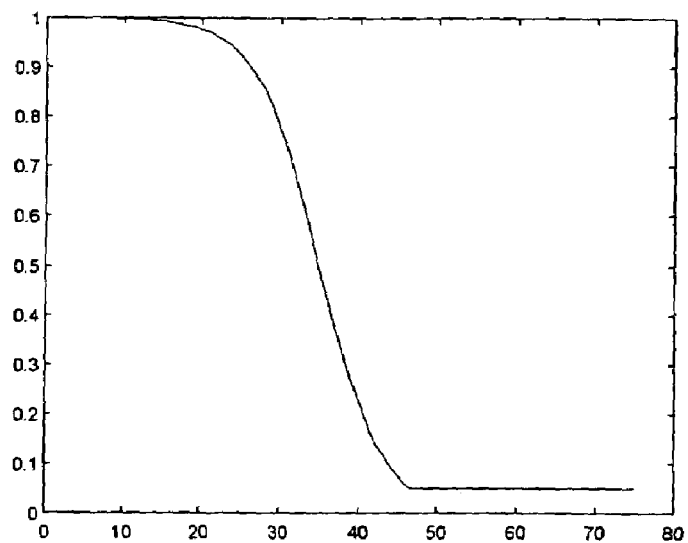
FIG. 4C illustrates a confidence data curve for the compactness feature of a target in accordance with exemplary embodiments of the present invention.

FIG. 4C represents what a typical confidence data curve would look like for the compactness feature of an object. Thus, if the compactness of a target were equal to 25 then the confidence that this object is a valid object would be around 92.5%.

The final feature to examined is the object's segment's edge directions. The goal is to measure how many directions make up the object's edges. A description on how edge directions are formed has been provided above. All the needs to be restated here is that the directions in the edge direction image are quantized to one of 8 unique directions. Thus, an object edge can have direction values that are from 1 to 8. Through empirically analysis it has been determined that an object will usually be made up of six, seven or eight edge unique directions. Once the edge direction image has been generated by the Sobel operator, then image needs to be cleaned up. This can be accomplished by multiplying the edge direction image with the binary cleaned edge image. The resultant image will be a cleaned edge image and it is this image that will be worked upon.

To determined how many edges are in an image each pixel in the image is examined, and based upon on its value a mark is placed at its value in a 9-bin array. This done by first creating an array of zeros that can hold nine values. A first zero in the array represent zeros, the second zero represents ones, the ninth zero represents eight, etc. The image is examined at each pixel location for its value. In the 9-bin array the zero at the positional value of the pixel is converted to a one. If this has already been previously performed then the next pixel is examined. The end result of this process will be where only the positional values in the array that are in the image will be equal to one and all other values will be zero. Then sum up the array and subtract one from it and that will state how many edges are present in the image.

Once the number of edges that are in the edge direction image have been determined then an edge direction validation confidence measure can be calculated. The method chosen to do this is to use the following look up table to determine the percentage that each edge direction value is equal too. These values were determined through empirical analysis.

| # of Edges | Confidence Percentage |
|---|---|
| 0 | 0 |
| 1 | 0 |
| 2 | .02 |
| 3 | .175 |
| 4 | .38 |
| 5 | .6 |
| 5 | .8 |
| 6 | .945 |
| 8 | 1 |

After all the confidence measures have been calculated for each individual feature then they are used in the following equation to help generate the auto-select Confidence Measure (ACM) which is passed out to the Baseline Tracker (step 465).

ACM=(Area Confidence+PermConfidence+Comp

Confidence+Edge Dir confidence)/4 (45)

The ACM is converted into a binary value by thresholding it in the following manner. There are two different types of outputs for this algorithm. The internal outputs which help control the auto-select function and the external outputs that give the tracker what it asks for. For external outputs the auto-select function gives the tracker the targets centroid location in pixel space, object box size in pixels, and the ACM (step 470). If the imagery has been downsampled then the following variables are modified:

$$row = row * downsample * 2$$
$$col = col * downsample * 2$$
$$Lsize = Lsize * downsample * 2$$
$$Tsize = Tsize * downsample * 2$$
$$Edge\ img2\ col = edge\ img2\ col * downsample * 2$$
$$Edge\ img2\ row = edge\ img2\ row * downsample * 2$$

Along with the external outputs the auto-select also keeps a history of the following internal calculated values on a frame-by-frame basis:

Area, perimeter, Lsize, Tsize, True area, True perimeter, True Lsize, True Tsize where the true variable are set equal to the following values $$Area\ True = Area$$
$$Perimeter\ True = Perimeter$$
$$Lsize\ True = Lsize$$
$$Tsize\ True = Tsize$$

This occurs whether or not the ACM is 1 or 0. If the ACM is equal to zero then internally the AS sets the following variables:

row=Target 7 position that was calculated when the ACM was last equal to 1 col=Target x position that was calculated when the ACM was last equal to 1

Lsize=Lsize that was calculated when the ACM was last equal to 1

Tsize=Tsize that was calculated when the ACM was last equal to 1

Area=The average of the area true values from the previous five frames.

Perimeter=The average of the perimeter true values from the previous five frames Time=time+1

If time=1

Ref box size last known=[Lsize when the ACM was last equal to 1, Tsize when the ACM was last equal to 1]

If the AS quality measure stays 0 for 15 frames then the following values are created rc_1=standard deviation of the last four Lsize values rc_2=standard deviation of the last four Tsize values If rc_and rc_2 are both less than 0.5 then all the above mentioned output values are replaced with the following values Lsize=The previous five Lsize values are replaced with the previous five Lsize true values.

Tsize=The previous five Tsize values are replaced with the previous five Tsize true values.

Area=The previous five area values are replaced with the previous five area true values.

Perimeter=The previous five perimeter values are replaced with the previous five perimeter true values.

row=Object y position that was calculated during this frame col=Object x position that was calculated during this frame Area=The average of the previous three area values.

Perimeter=The average of the previous three perimeter values.

ACM=1

Time=0

It was determined that if the auto-select quality measure was 0 for 15 frames then either the tracker had lost the object or that the object signature had changed significantly during the run.

Figure 6:
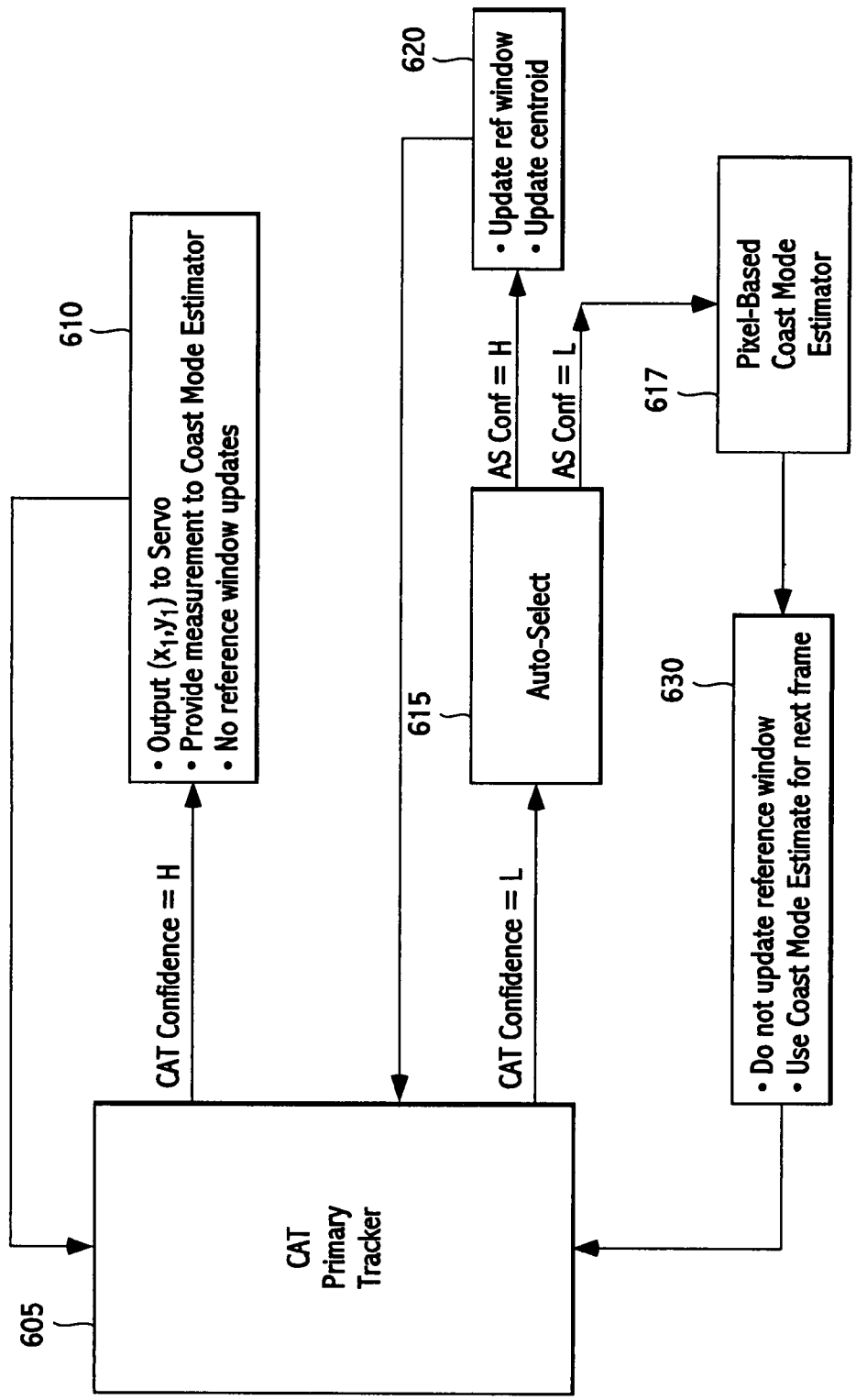
FIG. 6 illustrates a primary tracker in accordance with exemplary embodiments of the present invention.

FIG. 6 illustrates the general functioning of the primary tracker within the tracker system in accordance with exemplary embodiments of the present invention. If the primary tracker (605) outputs a high confidence value, then the object position output by the primary tracker is provided to the control system to control, for example, a servo (610). Measurements are also provided to the pixel-based coast mode estimator, and the reference window is not updated (610). If the primary tracker (605) indicates a low confidence level, and the auto-select function (615) has a high confidence level, the reference window and centroid location are updated for the primary tracker based upon information provided by the auto-select function (620). If the primary tracker (605) and the auto-select function (615) have a low confidence output, the pixel-based coast mode estimator (617) provides its output to the primary tracker for the primary tracker to use as the estimated position of the object in the next frame (630). In this situation the reference window is not updated (630).

Figure 7:
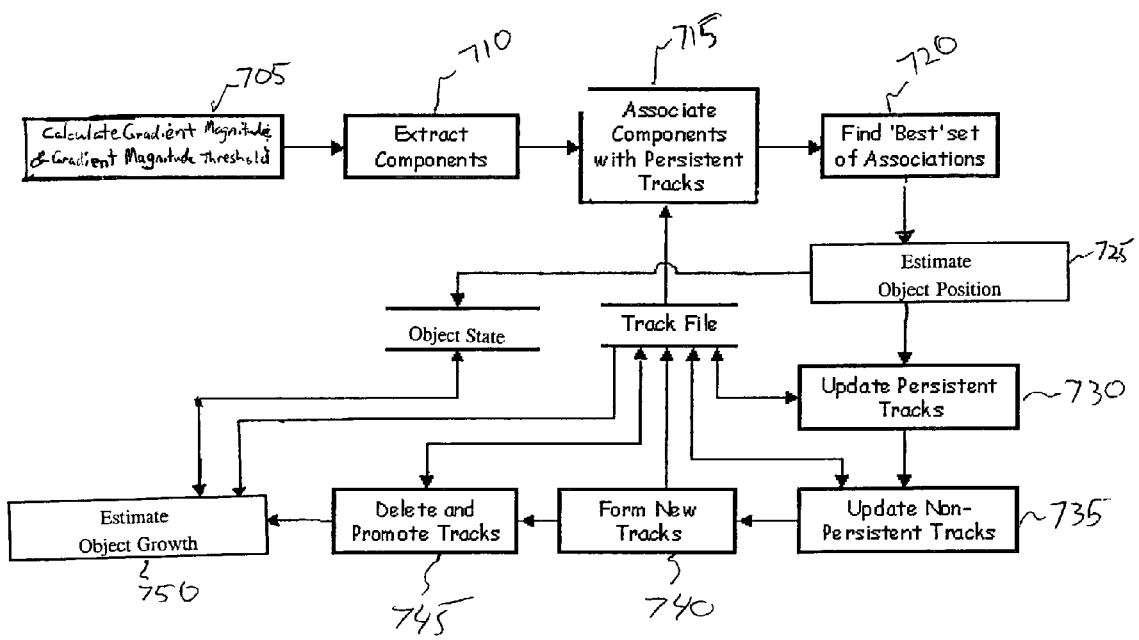
FIG. 7 illustrates the operation of a primary tracker in accordance with exemplary embodiments of the present invention.

FIG. 7 illustrates the processing performed by the primary tracker, i.e., the components association tracker. The component association tracker receives an input image frame and calculates a gradient vector image comprising the gradient magnitudes and gradient directions (705). A threshold is applied to the gradient magnitude to eliminate the gradient vectors whose gradient magnitudes are less than the threshold. The threshold is selected to control the processing load of the components association tracker. When the tracker is first initialized, the gradient magnitude threshold is set to 10%. As will be described in more detail below, the gradient magnitude threshold is selected to control the processing load of the components association tracker.

Components are then extracted from the thresholded gradient vector image (710). Specifically, a component is a group of pixels that have the same gradient direction and are connected along horizontal or vertical pixel edges, i.e., 4-connected. Components that contain pixels that are at the edge of the processing window can be ignored since it is likely that the entire component is not being detected. Additionally, components that have less than a set number of pixels can be ignored. This set number of pixels is a threshold which is selected to control the processing load of the component association tracker. Specifically, when the components association tracker is initialized, the set number of pixels is set equal to one and the gradient magnitude threshold is set equal to 10%. The set number of pixels and the gradient magnitude percentage are adjusted on each frame after the components are extracted. If the number of components prior to the application of the set number of pixels is greater than 0.8 times the maximum component storage space of the tracker, then the gradient magnitude threshold equals the current gradient magnitude threshold times 0.98. If the final number of components is greater than 50, the set number of pixels is incremented by one. If the final number of components is less than 30, and the set number of pixels is greater than one, the set number of pixels is decremented by one. If the final number of components is less than 30 and the set number of pixels equals one, the gradient magnitude threshold is set equal to the current gradient magnitude threshold divided by 0.98, to a maximum of 20%.

Once the components association tracker has entered track mode, the object location and object size are initialized to those values provided by the auto-select function. The object velocities are initialized to zero. New tracks are started from all components that have not been associated with any existing tracks. Since for the first frame there are no previous tracks, tracks are created from all of the components. When tracks are created a data structure is created to store data associated with the track. For example, the data structure can include: a field for a unique track identification; an estimated x and y position of the track; a measured x and y position of the track; a predicted x and y position of the track; an estimated x and y velocity in pixels/frame; the gradient direction of the track; the age of the track in number of frames for which the track has been in existence; a count of the total number of frames for which the track is associated with a component; a counter of the number of frame that the track is allowed to coast; a flag which indicates that the track has existed long enough to be considered reasonably consistent; a flag indicating that the track is part of the object; and the relative x and y location of the track within the object box. A flag is set for any tracks that are within the object size.

The extracted components are associated with persistent tracks (715). Specifically, for each established track in the track file, the tracker determines which components are spatially close enough to the predicted track position to represent a possible association. Tracks will only be associated with components that have the same edge direction as the tracks. The spatial proximity is determined by the size of the search window. A list containing all the possible associations is created for each track that has possible component associations. For each association the list will contain pointers to the track and the component, and the track location that this association would produce.

Next a best set of associations is determined (720). To determine the best set of associations, the first track-component association is used as the center of a new cluster, and values for mean and variance statistics in the x and y directions are calculated. For all other tracks, the track-component association that is closest to the center of this cluster is selected. If the best association for the track is within a predetermined distance of the cluster center, the track component association is added to the cluster, removed from further consideration, and the mean and variance values are recalculated. If the best association for the track is not within the predetermined distance, a point that is within the predetermined distance from the mean is added to the cluster statistics of mean and variance. These steps are performed until all associations are used in a cluster. The cluster with the smallest combined x and y variance is selected as the best set of associations. The best set of associations are used as the estimate of the object position using the previous object position and velocity estimates (725).

After estimating object position each track which is associated with a component is updated (730). Specifically, the x and y positions, the x and y estimated positions, the x and y velocities, the age counter, and an association counter are updated. Tracks which are not associated with a component are updated such that their x and y positions, and their x and y estimated positions, are updated to equal the x and y predicted positions based upon the best set of associations.

After established tracks have been processed, any remaining components are associated with the non-established tracks (735). Starting with the oldest tracks, each track is tested to find a component that has the same direction and is closest to the predicted position of the track, provided the separation is less than the predetermined distance. If a component meets these criteria it is assigned to the track (740), otherwise the track has no component associated with it. Each time a track is associated with a component a counter value is incremented, while if a track is not associated with a component the counter value is decremented. Accordingly, tracks for which the counter equals zero are deleted from the track file any tracks for which an age counter equals a predetermined age value are established tracks and have their established track flag set (745). Any newly established tracks for which the x and y positions are within the object size, and have a combined velocity less than the maximum object velocity are declared part of the object and have their object flag set.

After deleting and promoting tracks, the component association tracker estimates the growth of the object (750). The object growth is determined by comparing the predicted positions of the object tracks with their measured positions. A straight line is fit to the data in accordance with the following equation:

$$\text{MeasuredPosition} = \text{Slope} * (\text{PredictedPosition}) + (\text{Intercept}) \qquad (46)$$

A separate straight line fit is performed for the width and the height of the object. For the width of the object only object tracks which have non-horizontal gradient directions are used. For the height of the object only object tracks that have non-vertical gradient directions are used. If there are less than 4 data points available for the line fit, the size is not updated in that dimension. The object size growth is low-pass filtered and the width to height ratio of the object is limited between one and two.

In addition to outputting an estimate of the position of the object in an image frame, the primary tracker outputs a confidence value associated with the estimate. The confidence value can be calculated by determining the square root of the ratio of number of component to object track associations versus the total number of object tracks.

Figure 8:
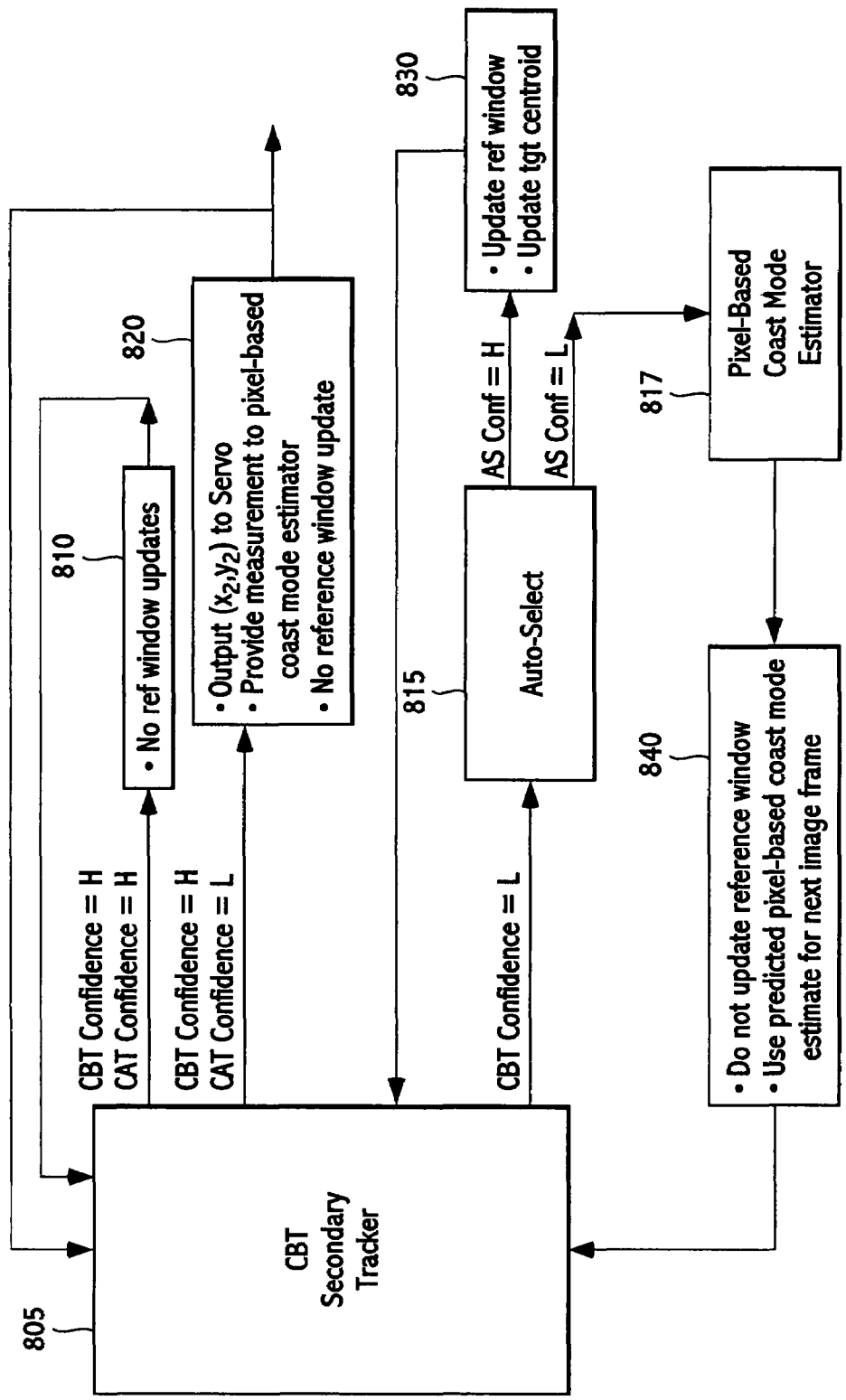
FIG. 8 illustrates a secondary tracker in accordance with exemplary embodiments of the present invention.

FIG. 8 illustrates the general functioning of the secondary tracker (805) within the tracking system in accordance with exemplary embodiments of the present invention. If the secondary tracker (805) and the primary tracker (e.g., CAT Primary Tracker 605) output a high confidence value, then the secondary tracker does not update its reference window (810). If the secondary tracker (805) outputs a high confidence value & while the primary tracker outputs a low confidence value, the object position output by the secondary tracker is provided to the control system to control, for example, a servo (820). Additionally, the measurement values are provided to the pixel-based coast mode estimator, and secondary tracker does not update its reference window (820). If the secondary tracker (805) outputs a low confidence value while the auto-select function (815) outputs a high confidence value, the secondary tracker updates its reference window and its object centroid (830). If, however, the auto-select function (815) outputs a low confidence value while the secondary tracker (805) is outputting a low confidence value, the secondary tracker does not update its reference window, and uses the estimate provided by the pixel-based coast mode estimator (817) for the next image frame (840).

Figure 9:
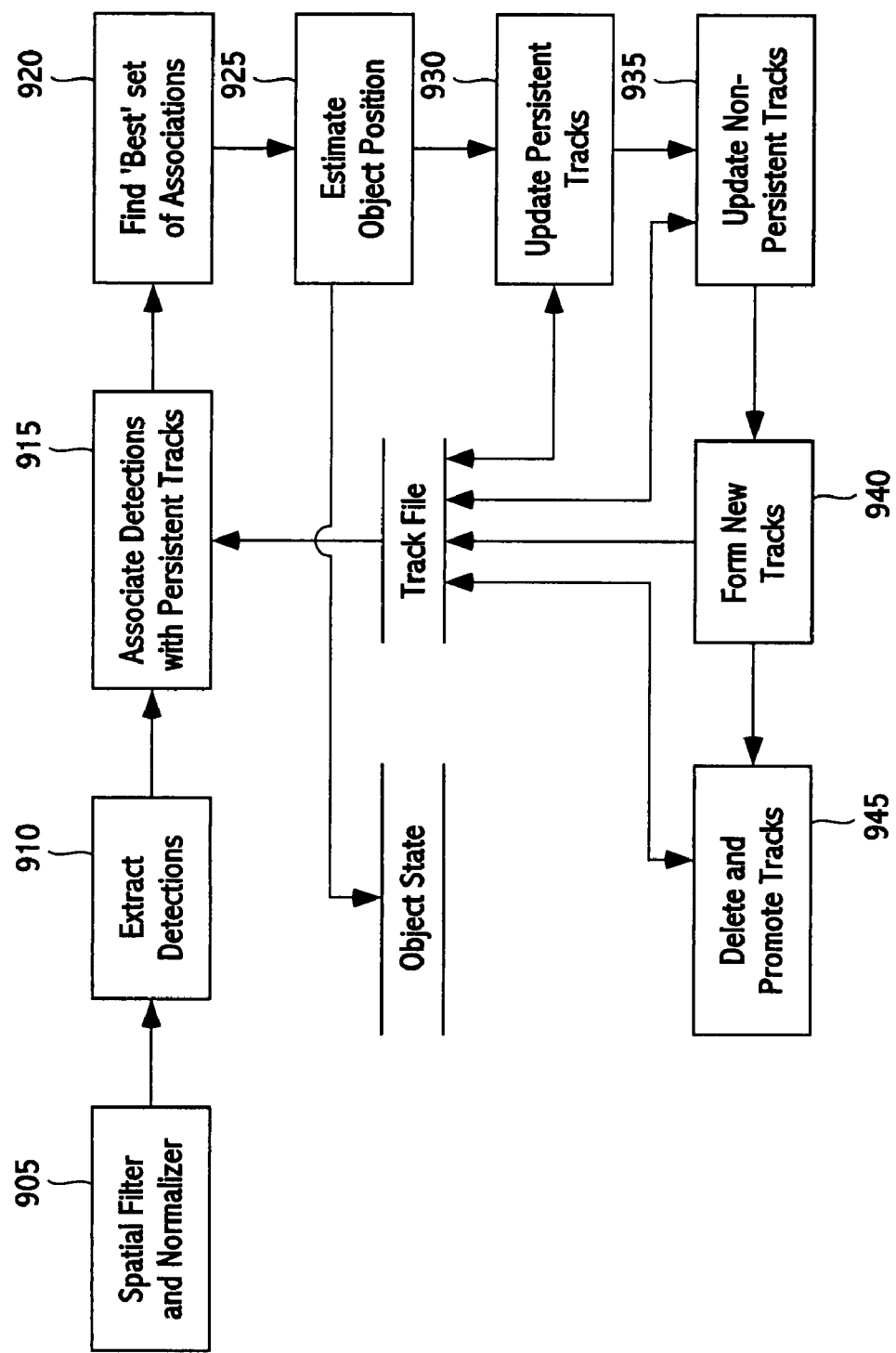
FIG. 9 illustrates a method performed by the secondary tracker in accordance with exemplary embodiments of the present invention.

As discussed above, the secondary tracker comprises three different trackers, the selection of which is based upon a distance to the intended object. Specifically, the secondary tracker comprises an unresolved target tracker, a magnitude template tracker and a balanced template tracker. The unresolved target tracker operates when there is a large distance to the object, e.g., between approximately 8 kilometers and 5 kilometers. FIG. 9 illustrates the processing performed by the unresolved target tracker. In general, the unresolved target tracker operates in a similar manner to that discussed above with regard to the components association tracker employed by the primary tracker, illustrated in FIG. 7, where steps 715-745 of FIG. 7 are similar to the corresponding steps 915-945 of FIG. 9. Accordingly, only the differences between the components association tracker and the unresolved target tracker will be described.

The initiation of tracks in the unresolved target tracker operates similarly to that of the primary tracker, except that tracks are initiated for the first frame in the same manner as in all subsequent frames. No tracks are established or designated as an object on the first frame. Since there are no established tracks, the unresolved target tracker runs open loop until tracks are established and an object is designated. Moreover, the unresolved target tracker includes an intensity field in the track record which is initialized with the magnitude of the object's detection.

The unresolved target tracker tracks an object that appears in an image frame as a single bright point. Accordingly, when the component association tracker employs components in the processing, the unresolved target tracker employs detection of bright points. Initially, a portion of the input image frame is extracted around the predicted object location. The size of this window is a fixed size which is based upon available processing capabilities. The extracted image frame is filtered with a spatial filter to enhance point objects (905). Specifically, the design of the spatial filter is based upon the expected appearance of a point object, including optical effects, and the expected appearance of typical clutter in an image. The output of the spatial filter is processed to identify the ten largest peaks in the image frame, these peaks can be either positive or negative contrast values.

A threshold is initialized to a predetermined minimum threshold value, and the spatially filtered image frame is processed by this threshold value to identify points where the absolute value exceeds the current threshold. These points are then checked to determine that they are either a local maxima or minima. For positive contrast points, the contrast value must be greater than the contrast values of the surrounding eight neighbor contrast points. For negative contrast points the contrast value must be less than the surrounding eight contrast points. Each point which passes these tests are added to the detection list (910). If the list is already full of detections, a search is performed to determine the detection in the list which has the smallest contrast magnitude. If the new detection has a larger magnitude, it will replace the old detection in the list. The minimum contrast magnitude in the detection list is then determined and employed as the new detection threshold. The remainder of the processing performed by the unresolved target tracker in steps 915-945 operates in a similar manner to that described above in connection with the corresponding steps 715-745 of FIG. 7 for the component association tracker. However, since the unresolved target tracker tracks single points in an image frame, there is no updating of the object size (step 750). The confidence value for the unresolved target tracker is calculated by calculating the square root of the quantity of correlated target tracks divided by the total number of target tracks.

Figure 10:
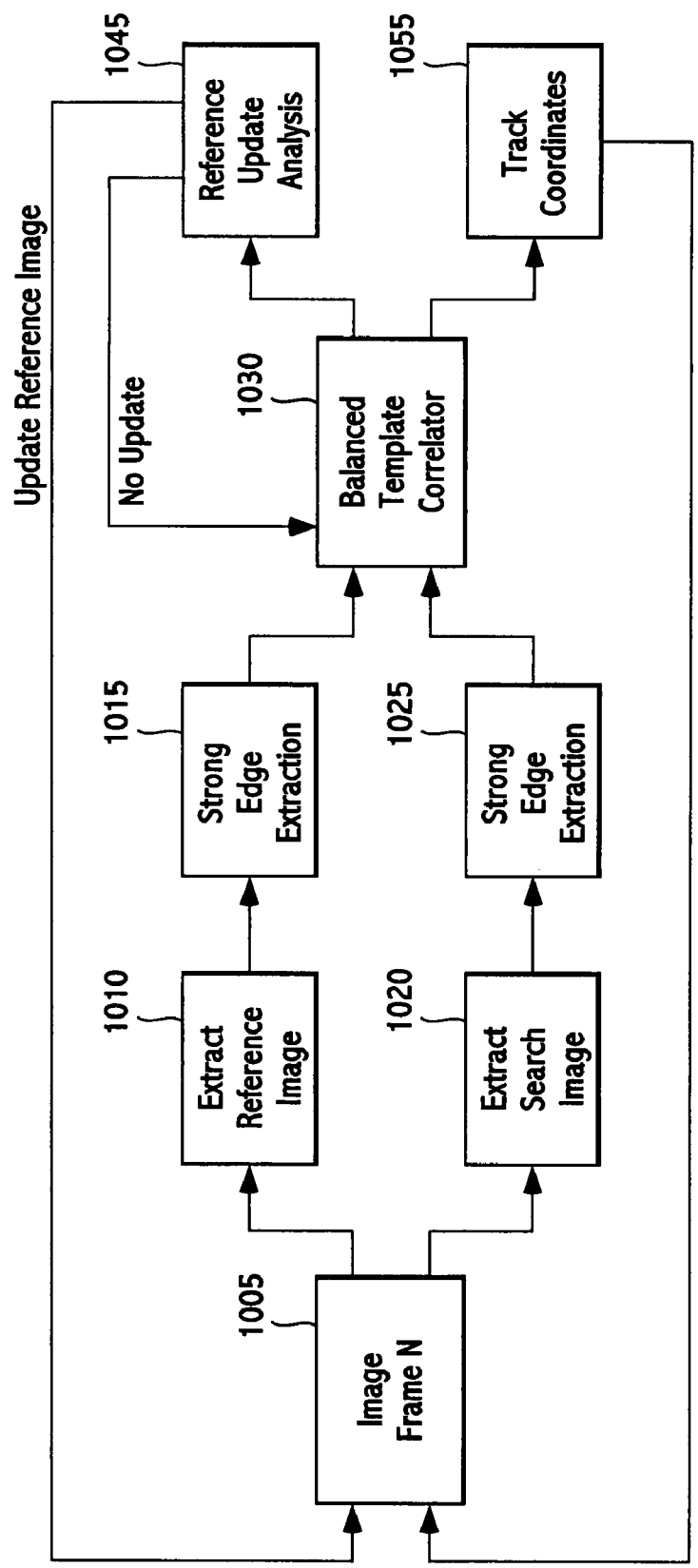
FIG. 10 illustrates processing performed by the secondary tracker in accordance with exemplary embodiments of the present invention.

FIG. 10 illustrates the processing performed by the balanced template tracker. The balanced template tracker is employed for ranges to the object smaller than the unresolved template tracker but larger than the magnitude template tracker, e.g., it operates at a range of approximately 5 kilometers to 3.5 kilometers. The balanced template tracker is an image-based frame-to-frame correlation tracker, and operates in a similar manner to conventional correlation based trackers. Accordingly, an input image frame 1005 is employed to extract a reference image 1010. The reference image is of a sufficient size to encompass the object, but contains as little of the background as possible. Typically, the reference image will be obtained from the first frame of the video sequence after the operator, or an automatic target acquisition technique, has designated the object. Strong edge extraction is performed on the extracted reference image 1015.

Figure 11A:
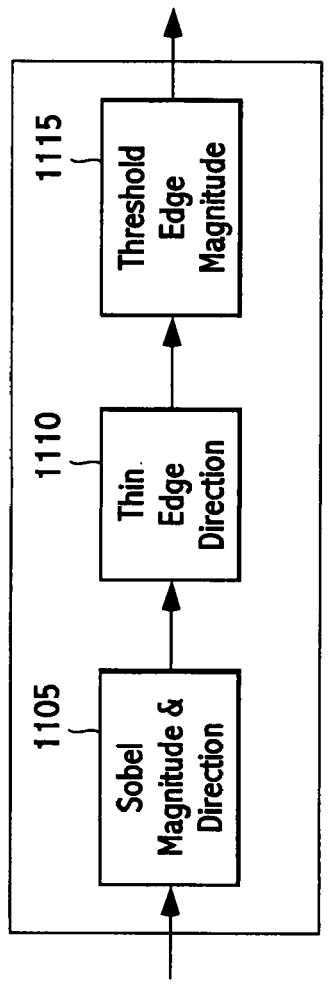
FIGS. 11A and 11B illustrate processing performed by the secondary tracker in accordance with exemplary embodiments of the present invention.

FIG. 11A illustrates the processing performed by the strong edge extraction. Specifically, a Sobel operator is applied to the extracted reference image to produce a gradient magnitude and direction image 1105. Edges in the image are thinned by removing weaker edge pixels surrounding the strong edge pixels 1110. The edge thinning is essentially a directionally guided magnitude filter. Specifically, each pixel in the gradient magnitude image is compared to a subset of its neighbor pixels. The direction of each pixel determines which neighboring pixels in the gradient magnitude image to remove. This results in a thinning of both the gradient magnitude and gradient direction images. Specifically, the particular neighboring pixels which are examined are the neighboring pixels in the same gradient direction and the opposite gradient direction as the current pixel. If either neighboring pixel has a higher gradient magnitude value than the current pixel, and that neighboring pixel has a gradient direction within 90° of the current pixel, then the current pixel is marked for deletion. Actual deletion of the pixels only occurs after each pixel in the image has been examined.

After thinning the image, a threshold value is applied to the image such that a fixed percentage of pixels remain in the reference image 1115. By fixing the percentage of pixels that remain, the actual threshold value can vary based upon the scene dynamics. In accordance with exemplary embodiments of the present invention, the threshold value can be selected so that 30% of the pixels exceed the threshold value. Once the threshold has been applied to the gradient magnitude image, the corresponding edge direction pixels in the gradient direction image are retained.

Returning to FIG. 10, after the reference image has been acquired, a search region, which is a maximum of double the size of the reference image, is extracted from the image 1020. Strong edge detection extraction 1025 is performed in a similar manner to that described above with respect to the extracted reference image.

Figure 11B:
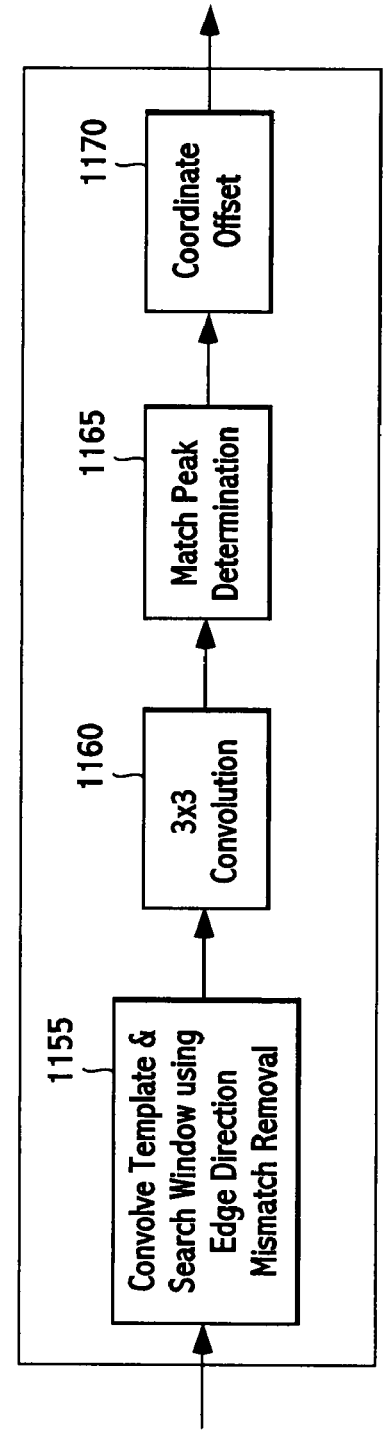

The resulting images from the strong edge extraction processing functions 1015 and 1025 are provided to a balanced template correlater 1030. FIG. 11B illustrates the processing performed by balanced template correlater 1030. Initially, the reference window is convolved with the search window using edge direction mismatch removal 1155. For example, 3×3 convolution can be performed 1160. Specifically, as the reference window slides around the search window, each edge direction pixel in the reference image is compared to a corresponding edge direction pixel in the search image. If both gradient directions are the same, then this edge direction pair is recorded as a match. Once all of the pixels have been compared, the total number of matches is calculated to form the correlation value. This process is performed for each of the template-to-search region offsets to create a correlation surface. The offset that causes the highest correlation, i.e., number of possible matches, is selected for output 1165. If there is more than one maximum correlation value in the correlation surface, the offset that causes the least amount of position deviation from the last image frames output position is selected 1170. When the quality value falls below a predetermined threshold, a flag is set to indicate a low correlation between the reference and search images. Based on the output of the balanced template correlator 1030, it is determined whether to update the reference image 1045. A running history of the past quality values are stored, and if the past three of five quality values have dropped below the threshold, then a loss of track condition is indicated 1055.

The third tracker employed by the secondary tracker is a magnitude template tracker. The magnitude template tracker performs a reference template-to-search region correlation process similar to that of the balanced template tracker, except that it performs the correlation calculations on the gradient magnitude image. Specifically, the correlation function calculates the position in the search image which has the highest correlation with the reference image. This is performed by sliding the reference image over the search image at each pixel location, and computing the absolute minimum difference between the two images. The absolute minimum difference is calculated in accordance with the following equation:

$$AbsMinDifference(x, y) = \sum_{j=-RW/2}^{j=RW/2} \sum_{K=-RH/2}^{K=RH/2} |R(j, k) - Srch(x + j, y + k)| \quad (47)$$

where R equals the gradient magnitude reference image, Srch is the gradient magnitude search image, RW is the reference image width minus one (for odd length widths), and RH is the reference image height minus one (for odd length height). The above notation assumes that the center pixel of the reference image is R(0,0). If the center pixel of the reference image is not R(0,0), an appropriate offset can be employed in accordance with conventional procedures. Performing the calculations above for each pixel in the search image provides a correlation surface in which the location of the minimum value represents the location of the maximum correlation between the reference image and the search image.

After the maximum correlation position has been determined, the correlation quality is computed. The correlation quality is computed by normalizing the template and search images, and calculating the sum of the products. To normalize the reference image each pixel in the image is divided by its power in accordance with the following equations:

$$RNorm\ (x, y) = \frac{R(x, y)}{PWR} \quad (48)$$

$$PWR = \left[\sum_x \sum_y R^2(x, y)\right]^{1/2} \quad (49)$$

where RNorm (x, y), is the normalized reference image PWR is the image intensity power and R is the reference image.

The search image is normalized using the same equations, however, the power calculation is not performed using the entire search image, but instead using a region around the maximum correlation point, (the region being the same size as the reference image), in accordance with the following equation:

$$Srch\ PWR = \left[\sum_{x1}^{x2} \sum_{y1}^{y2} S^2(x, y)\right]^{1/2} \quad (50)$$

where x1=Mx−(RW/2), x2=Mx+(RW/2), y1=My (RH/2), y2=My+(RH/2), Mx equals x pixel position of maximum correlation, My equals y pixel position of maximum correlation, RW equals reference image width minus one (for odd length widths), and RH equals the reference height minus one (for odd length height). The correlation quality at the maximum correlation point can be calculated as the sum of the products of the two normalized images in accordance with the following equation:

$$Quality(Mx, My) = \sum_{j=-RW/2}^{j=RW/2} \sum_{K=-RH/2}^{k=RH/2} R(j, k) - Srch(Mx + j, My + k) \quad (51)$$

Where Mx equals x pixel position of maximum correlation, My equals x pixel position of maximum correlation, and R equals the reference image. The output of the correlation function is the maximum correlation pixel position and its corresponding quality value. If there are multiple maximum correlation positions, the position which provides the smallest position deviation from the last image frame's output is employed. When the quality value falls below a predetermined threshold, the tracker sets a flag which indicates a low correlation between the reference and search images. A running history of the past quality values are stored. If the past three out of five quality values have dropped below the threshold, then a loss of tracking condition is indicated for the tracker.

When the primary tracker, the secondary tracker and the auto-select function all output low confidence value outputs, the pixel-based coast mode estimator is used to provide the estimated position of the object in the next image frame to the primary tracker, secondary tracker and auto-select function. In accordance with exemplary embodiments of the present invention, the pixel-based coast mode estimator employs a two-state Kalman filter. The image based two-state Kalman filter is a linear filtering technique which estimates the object's state vector from measurement data which may have been corrupted by noise. The two states are the object's position and velocity. The Kalman filter employs two sources for measurement data, object position measurements provided by the primary and secondary trackers, and the servo angular measurements which are provided to compensate for positional changes which occur independent of the object's movement. In accordance with exemplary embodiments of the present invention, two Kalman filters are employed, one filter for horizontal image direction (X-direction), and the other for vertical image direction (Y-direction), both of which are implemented employing the same mathematical equations.

The object's dynamics are modeled as a linear first-order system vector matrix differential equation:

$$\overset{*}{x}(t) = F(t)x(t) + G(t)w(t) + L(t)u(t) \tag{52}$$

where x(t) is the system state vector, w(t) is a random forcing function, u(t) is a deterministic control input, and F(t), G(t) and L(t) are matrices arising in the formulation. If the deterministic (control) input is considered to be zero, the equation reduces to the following:

$$\overset{*}{x}(t) = F(t)x(t) + G(t)w(t) \tag{53}$$

The state vector for the object's dynamic system consists of the quantities that describe the unforced motion of the object. If the state vector at a particular point in time and a description of a forcing function for that point in time is known, the state vector at any other time can be determined. The state transition for the system allows for the calculation of the state vector at time t, given complete knowledge of the state vector at time $T_0$. The state transition matrix is computed by solving the system dynamic equation when the forcing function w(t) is not present. Accordingly, the object's dynamic differential equation simplifies to $$\dot{x}(t) = F(t)x(t) \tag{54}$$

The object's state vector consists of the position and velocity of the object motion. The state transition matrix $\Phi$ is expressed as:

$$\Phi = \begin{bmatrix} 1 & \Delta t \\ 0 & 1 \end{bmatrix} \tag{55}$$

Since the present invention operates based upon discrete points in time when object position measurements and servo angular measures are available, the system can be modeled as a discrete system. Accordingly, the discrete form of the dynamics equation is:

$$\hat{x} = \Phi x + \Gamma w \tag{56}$$

The system will receive updated position measurements z which are related to the discrete system state x and the observation (measurement) matrix H in accordance with the following equation:

$$z = Hx + v \tag{57}$$

where v is the measurement noise. These measurements are used to reduce the error in the predicted state vector. Both the system state and forcing function are vectors whose elements are random variable, which are assumed to be unbiased. The random state and forcing function vectors are described in terms of their covariance matrices. An error $\tilde{x}$ in the estimate of the state vector is defined as the difference between the estimated $\hat{x}$ and the actual x value in accordance with the following equation:

$$\tilde{x} = \hat{x} - x \tag{58}$$

The covariance P of $\tilde{x}$ is expressed as:

$$P = \lfloor \tilde{x} \; \tilde{x}^T \rfloor \tag{59}$$

The object's state vector consists of two variables, the position and velocity as represented in the following equation:

$$\tilde{x} = \begin{bmatrix} \tilde{x}_1 \\ \tilde{x}_2 \end{bmatrix} \tag{60}$$

The covariance matrix of this two variable state matrix is:

$$P = E\left\{ \begin{bmatrix} \tilde{x}_1^2 & \tilde{x}_1\tilde{x}_2 \\ \tilde{x}_1\tilde{x}_2 & \tilde{x}_2^2 \end{bmatrix} \right\} = \begin{bmatrix} E[\tilde{x}_1^2] & E[\tilde{x}_1\tilde{x}_2] \\ E[\tilde{x}_1\tilde{x}_2] & E[\tilde{x}_2^2] \end{bmatrix} \tag{61}$$

The two-state Kalman filter's state estimate of the current x position, and velocity is described by the state vector $\hat{x}(t)$ and the symmetric covariance matrix P(t) in accordance with the following formula:

$$\hat{x}(t) = \begin{bmatrix} x(t) \\ v(t) \end{bmatrix} \quad P(t) = \begin{bmatrix} P_{00} & P_{01} \\ P_{10} & P_{11} \end{bmatrix} \tag{62}$$

The state vector and covariance matrix can be initialized to:

$$\hat{x}(0) = \begin{bmatrix} \tilde{x}(0) \\ 0 \\ 0 \end{bmatrix} \quad P(0) = \begin{bmatrix} \sigma_x^2 & 0 \\ 0 & \sigma_v^2 \end{bmatrix} \tag{63}$$

$$P = E[\tilde{x}\tilde{x}^T] \tag{64}$$

where $\tilde{x}(0)$ is the first measurement of the object position, $\sigma_x^2$ and $\sigma_v^2$ represent the variance of the position measurement and the variance of the estimated velocity, respectively. These variance values are initial estimates of the mean squared errors of the state vector. These variances can be either empirically derived, for example using existing test image sequences.

The Kalman filter predicts forward in time to the next state at time $\Delta t$. The state transition matrix describes how the state is updated. The state transition matrix $\Phi$ is determined in accordance with the following equation:

$$\Phi = \begin{bmatrix} 1 & \Delta t \\ 0 & 1 \end{bmatrix} \quad (65)$$

The predicted state vector equation can be represented as follows:

$$\hat{x}(t+\Delta t) = \Phi\hat{x}(t) = \begin{bmatrix} 1 & \Delta t \\ 0 & 1 \end{bmatrix}\begin{bmatrix} x_p \\ x_v \end{bmatrix} = \begin{bmatrix} x_p + x_v\Delta t \\ x_v \end{bmatrix} \equiv \hat{x} \quad (66)$$

The covariance is predicted in accordance with the following equation:

$$P(t+\Delta t) = \Phi P(t)\Phi^T + Q \equiv \hat{P}^- \quad (67)$$

$$\hat{P}^- = \begin{bmatrix} 1 & \Delta t \\ 0 & 1 \end{bmatrix}\begin{bmatrix} P_{00} & P_{01} \\ P_{10} & P_{11} \end{bmatrix}\begin{bmatrix} 1 & 0 \\ \Delta t & 1 \end{bmatrix} + Q$$

$$= \begin{bmatrix} P_{00} + P_{10}\Delta t & P_{01} + P_{11}\Delta t \\ P_{10} & P_{11} \end{bmatrix}\begin{bmatrix} 1 & 0 \\ \Delta t & 1 \end{bmatrix} + Q$$

The variable Q is a constant representing the process noise, models the velocity uncertainty as a constant parameter and can be derived in accordance with the following matrix:

$$Q = \begin{bmatrix} \sigma_n^2 & 0 \\ 0 & 0 \end{bmatrix} \quad (68)$$

The process noise $\sigma_n^2$ is set to a value of 1/16th of a pixel until CSF simulation runs can be used to empirically derive this value. The process noise is used to estimate the error covariance. Substituting and solving the equation, the predicted covariance can be calculated in accordance with the following:

$$\hat{P}^- = \begin{bmatrix} P_{00} + P_{10}\Delta t + P_{01}P_{11} + \Delta t^2 + \sigma_n^2 & P_{01} + P_{11}\Delta t \\ P_{10} + P_{11}\Delta t & P_{11} \end{bmatrix} \quad (69)$$

When a tracker's measurement of the object's position state has been determined, the Kalman gain is computed, and is used to update the state vector and covariance matrix. The Kalman gain is calculated in accordance with the following:

$$K^+ = P^- H^T(HP^- H^T + R)^{-1} \quad (70)$$

In the equation above, measurement vector H is related to the position measurement that is tracked, and thus, the H vector is $$\begin{bmatrix} 1 \\ 0 \end{bmatrix}.$$

The measurement noise matrix R is modeled as a single constant value representing the measurement noise in the object position. The measurement noise is set to the initial covariance of the object position $\sigma_x^2$. Substituting into the Kalman gain equation results in the following:

$$K^+ = \begin{bmatrix} P_{00}^- & P_{01}^- \\ P_{10}^- & P_{10}^- \end{bmatrix}\begin{bmatrix} 1 \\ 0 \end{bmatrix}\left([1\ 0]\begin{bmatrix} P_{00}^- & P_{01}^- \\ P_{10}^- & P_{11}^- \end{bmatrix}\begin{bmatrix} 1 \\ 0 \end{bmatrix} + \sigma_{meas}^2\right)^{-1} \quad (71)$$

$$= [P_{00}^-\ P_{10}^-](P_{00}^- + \sigma_{meas}^2)^{-1}$$

$$= [P_{00} + P_{10}\Delta t + \sigma_p^2\ \ P_{01} + P_{11}\Delta t + \sigma_p^2][P_{00}^- + \sigma_{meas}^2]^{-1}$$

$$= \begin{bmatrix} \dfrac{P_{00} + P_{10}\Delta t + \sigma_p^2}{P_{00}^- + \sigma_{meas}^2} \\ \dfrac{P_{01} + P_{11}\Delta t + \sigma_p^2}{P_{00}^- + \sigma_{meas}^2} \end{bmatrix} \equiv \begin{bmatrix} K_0 \\ K_1 \end{bmatrix}$$

The state vector and covariance matrix are updated using the update equations. The state vector update equation can be performed in accordance with the following:

$$\hat{x}^+ = \hat{x}^- + K(z - H\hat{x}^-) \quad (72)$$

where $\hat{x}^+$ is the updated state and $\hat{x}^-$ is the previous state. The servo angular measurement is employed to update the state vector such that the change in the servo angular measurement adjusts the previous predicted state. The measurement portion of the update equation $(z-H\hat{x}^-)$ becomes $(z-H(\hat{x}^-+\Delta\alpha))$ where z is the position measurement and $\Delta\alpha$ is the delta change in the servo angular measurement since the last measurement. It is assumed that the sample rate of the servo measurement and the object position measurement are equal. However, if they are not sampled at the same rate, then a time alignment will be performed to make use of the servo measurements. Accordingly, the state vector update equation becomes:

$$\hat{x}^+ = \begin{bmatrix} \hat{x}_p^- \\ \hat{x}_v^- \end{bmatrix} + \begin{bmatrix} K_0 \\ K_1 \end{bmatrix}\left(z^- [1\ 0]\begin{bmatrix} \hat{x}_p^- + \Delta\alpha \\ \hat{x}_p^- + \Delta\alpha \end{bmatrix}\right) \quad (73)$$

$$= \begin{bmatrix} \hat{x}_p^- + K_0(z^- (\hat{x}_p^- + \Delta\alpha)) \\ \hat{x}_v^- + K_1(z^- (\hat{x}_p^- + \Delta\alpha)) \end{bmatrix}$$

The covariance matrix is updated using the equation:

$$P^+ = (I - KH)P^- \quad (74)$$

$$P^+ = \left[\begin{bmatrix} 1 & 0 \\ 0 & 1 \end{bmatrix} - \begin{bmatrix} K_0 \\ K_1 \end{bmatrix}[1\ 0]\right]\begin{bmatrix} P_{00}^- & P_{01}^- \\ P_{10}^- & P_{11}^- \end{bmatrix}$$

$$= \left(\begin{bmatrix} 1 & 0 \\ 0 & 1 \end{bmatrix} - \begin{bmatrix} K_0 & 0 \\ K_1 & 0 \end{bmatrix}\right)\begin{bmatrix} P_{00}^- & P_{01}^- \\ P_{10}^- & P_{11}^- \end{bmatrix}$$

$$= \begin{bmatrix} 1-K_0 & 0 \\ -K_1 & 0 \end{bmatrix}\begin{bmatrix} P_{00}^- & P_{01}^- \\ P_{10}^- & P_{11}^- \end{bmatrix}$$

$$= \begin{bmatrix} P_{00}^- - P_{00}^- K_0 & P_{01}^- - P_{01}^- K_0 \\ -P_{00}^- K_1 & -P_{01}^- K_1 \end{bmatrix}$$

Once the state vector and covariance matrices have been updated, the state transition matrix is employed to predict the state estimates for the next frame. This process is repeated recursively during the life of the track.

In order to simplify the use of servo angular measurement data, the state vector equations can be applied in angular space. The object position update is converted to angular measures using knowledge of the image sensor's instantaneous field of view (IFOV) and desired center location in the sensor/image plane. The conversion from pixel space to angular, assuming small angles, can be calculated in accordance with the following:

$$\phi = (x_p * \text{IFOV}) - (c_x * \text{IFOV}) \qquad (75)$$

Thus, the state update is applied in angular space instead of image space. The conversion from angular space to image space can be performed in accordance with the following equation:

$$x = ((\phi/\text{IFOV}) - c_x)) \qquad (76)$$

To initialize the covariance matrix, the process noise matrix and the measurement noise vector the following values can be used:
IFOV=0.116 milliradians
TgtMaxVel=20 km
Range=5 km $$\text{Initial Covariance-}P(0) = \begin{bmatrix} IFOV/4 & 0 \\ 0 & ((TgtMaxVel/Range)/3.0)^2 \end{bmatrix}$$

$$\text{Measurement Noise-}Q = \begin{bmatrix} IFOV/16 & 0 \\ 0 & 0 \end{bmatrix}$$

Process Noise—R=(IFOV/4)

Although the components association tracker has been described above as operating in conjunction with a secondary tracker, the components association tracker can operate as the only tracker of a tracking system. Additionally, although particular types of trackers have been described as comprising the compound backup tracker, other types of trackers can be employed based upon their ability to recognize objects at particular ranges of distances.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of tracking an object comprising:
    receiving an image of a scene, the scene comprising the object;
    processing the image with a plurality of trackers to produce an estimate of a position of the object, wherein the processing comprises:
    processing the image with a first tracker to produce a first estimate of the position of the object in the image and an associated first confidence value, and
    processing the image with a second tracker, concurrently with the first tracker, to produce a second estimate of the position of the object in the image and an associated second confidence value, the second tracker processing the image using one or more of a plurality of processing techniques, wherein the second tracker selects which of the processing techniques are used based upon a distance between the object and a device comprising the first and second trackers;
    selecting one of the produced estimates of the position of the object in the image using the first and second confidence values; and
    tracking the object using the selected estimate.

2. The method of claim 1 further comprising:
    processing the image to produce a third estimate of the position of the object in the image, wherein selecting one of the produced estimates includes selecting the third estimate based on a comparison of the first and second confidence values to a predetermined threshold.

3. The method of claim 2, further comprising:
    segmenting the image to produce a fourth estimate of the position of the object in the image and an estimate of a size of the object in the image; and
    providing the fourth estimate of the position and the estimate of the size to the first or second tracker based upon the first and second confidence values, respectively.

4. The method of claim 3, wherein the fourth estimate is used by the first or second tracker to reinitialize its tracking of the object in the image.

5. The method of claim 1, wherein the step of tracking the object comprises:
    providing the selected estimate to a control system; and
    adjusting parameters of the control system based on the selected estimate.

6. The method of claim 1, wherein the plurality of processing techniques includes a first processing technique that is an unresolved target tracking technique.

7. The method of claim 6, wherein the unresolved tracking technique tracks a single pixel in the image.

8. The method of claim 6, wherein the plurality of processing techniques includes a second processing technique that is a frame-to-frame correlation technique.

9. The method of claim 6, wherein the plurality of processing techniques includes a third processing technique that is a reference template-to-search region correlation process employing a gradient magnitude image.

10. The method of claim 1, wherein the first tracker tracks the object based upon components extracted from the image.

11. The method of claim 10, wherein the components are groups of pixels that have a same gradient direction and are connected along horizontal or vertical pixel edges.

12. A system comprising:
    a plurality of trackers to produce an estimate of a position of an object in an image, the plurality of trackers comprising:
    a primary tracker which processes the image and outputs a first estimate of the position of the object in the image and an associated first confidence value; and
    a secondary tracker which processes the image, concurrently with the primary tracker, and outputs a second estimate of the position of the object in the image and an associated second confidence value, the secondary tracker processing the image using one or more of a plurality of processing techniques, wherein the secondary tracker selects which of the processing techniques are used based upon a distance between the object and the system; and
    an output selector processing circuitry which selects one of the outputted estimates of the position of the object in the image using the first and second confidence values.

13. The system of claim 12, further comprising:
    a third tracker which processes the image and outputs a third estimate of the position of the object, wherein the output selector selects the third estimate based on a comparison of the first and second confidence values to a predetermined threshold.

14. The system of claim 13, further comprising:
an object selector which receives the image and outputs a fourth estimate of the position of the object in the image, a size of the object in the image, and a fourth confidence value, wherein the fourth estimate of the position and the size of the object are provided to the primary or secondary tracker based on the first and second confidence values, respectively.

15. The system of claim 12, wherein the secondary tracker comprises:
a first secondary tracker that processes the image using a first processing technique of the plurality of processing techniques;
a second secondary tracker that processes the image using a second processing technique of the plurality of processing techniques; and
a third secondary tracker that processes the image using a third processing technique of the plurality of processing techniques, wherein whether the first, second or third secondary tracker outputs the second estimate is based on the distance between the system and the object.

16. The system of claim 15, wherein the first secondary tracker uses an unresolved target tracking technique which tracks a single pixel in the image.

17. The system of claim 15, wherein the second secondary tracker uses a frame-to-frame correlation tracking technique.

18. The system of claim 15, wherein the third secondary tracker uses a reference template-to-search region correlation tracking technique which employs a gradient magnitude image.

19. The system of claim 12, wherein the primary tracker tracks the object based upon components extracted from the image, wherein the components are groups of pixels that have a same gradient direction and are connected along horizontal or vertical pixel edges.

20. A system comprising:
a plurality of trackers, comprising:
a primary tracker that processes an image and outputs a first estimate of a position of an object in the image and an associated first confidence value, and
a secondary tracker that processes the image, concurrently with the first tracker, and outputs a second estimate of the position of the object in the image and an associated second confidence value, the secondary tracker processing the image using one or more of a plurality of processing techniques, wherein the secondary tracker selects which of the processing techniques are used based on a distance between the system and the object;
an output selector processing circuitry which selects one of the first and the second estimates of the position of the object in the image using the first and second confidence values when the first and second confidence values are above a predetermined threshold; and
a third tracker which receives the image and outputs a third estimate of the position of the object in the image, wherein the output selector selects the third estimate when the first and second confidence values are below the predetermined threshold.

21. The system of claim 20, further comprising:
an object selector which receives the image and outputs a fourth estimate of the position of the object in the image and a size of the object in the image, wherein when the first or second confidence values are below the predetermined threshold for a predetermined amount of time, the fourth estimate of the position and the size of the object are provided to the primary or secondary tracker based on the first and second confidence values, respectively.

22. The system of claim 20, wherein the secondary tracker comprises:
a first secondary tracker that processes the image using a first processing technique of the plurality of processing techniques;
a second secondary tracker that processes the image using a second processing technique of the plurality of processing techniques; and
a third secondary tracker that processes the image using a third processing technique of the plurality of processing techniques, wherein whether the first, second or third secondary tracker outputs the second estimate is based one the distance between the system and the object.

23. The system of claim 22, wherein the first secondary tracker uses an unresolved target tracking technique which tracks a single pixel in the image.

24. The system of claim 22, wherein the second secondary tracker uses a frame-to-frame correlation tracking technique.

25. The system of claim 22, wherein the third secondary tracker uses a reference template-to-search region correlation tracking technique which employs a gradient magnitude image.

26. The system of claim 20, wherein the primary tracker tracks the object based upon components extracted from the image, wherein the components are groups of pixels that have a same gradient direction and are connected along horizontal or vertical pixel edges.

27. The method of claim 1, wherein the second tracker is configured to process the image using a plurality of different processing techniques.

28. The system of claim 12, wherein the secondary tracker is configured to process the image using a plurality of different processing techniques.

29. The system of claim 20, wherein the secondary tracker is configured to process the image using a plurality of different processing techniques.

* * * * *

UNITED STATES PATENT AND TRADEMARK OFFICE
CERTIFICATE OF CORRECTION

PATENT NO. : 7,657,059 B2  Page 1 of 1
APPLICATION NO. : 10/636763
DATED : February 2, 2010
INVENTOR(S) : Olson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 882 days.

Signed and Sealed this

Thirtieth Day of November, 2010

David J. Kappos
*Director of the United States Patent and Trademark Office*